(12) United States Patent
Byeon et al.

(10) Patent No.: US 11,304,076 B2
(45) Date of Patent: Apr. 12, 2022

(54) ELECTRONIC APPARATUS AND METHOD FOR CONTROLLING THE ELECTRONIC APPARATUS

(71) Applicant: SAMSUNG ELECTRONICS CO., LTD., Suwon-si (KR)

(72) Inventors: Seongho Byeon, Suwon-si (KR); Seongil Hahm, Suwon-si (KR); Jeongin Kim, Suwon-si (KR); Jaesick Shin, Suwon-si (KR); Sangwon Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/751,947

(22) Filed: Jan. 24, 2020

(65) Prior Publication Data

US 2020/0275292 A1 Aug. 27, 2020

(30) Foreign Application Priority Data

Feb. 21, 2019 (KR) .................. 10-2019-0020342

(51) Int. Cl.
*H04W 24/04* (2009.01)
*H04W 76/11* (2018.01)
(Continued)

(52) U.S. Cl.
CPC .......... *H04W 24/04* (2013.01); *H04W 8/005* (2013.01); *H04W 76/11* (2018.02); *G16Y 30/00* (2020.01)

(58) Field of Classification Search
CPC ..... H04W 24/04; H04W 76/11; H04W 8/005; H04W 4/026; H04W 4/12; H04W 4/70;
(Continued)

(56) References Cited

U.S. PATENT DOCUMENTS 9,203,838 B2 12/2015 Kuscher et al.
9,603,188 B2 3/2017 Gum
(Continued)

FOREIGN PATENT DOCUMENTS

KR 10-2011-0004597 1/2011
KR 10-1597657 2/2016
(Continued)

OTHER PUBLICATIONS

Search Report and Written Opinion dated May 19, 2020 in corresponding International Application No. PCT/KR2020/001410.

*Primary Examiner* — Eugene Yun
(74) *Attorney, Agent, or Firm* — Nixon & Vanderhye P.C.

(57) ABSTRACT

Disclosed are an electronic apparatus and a controlling method thereof. The method for controlling an electronic apparatus includes monitoring a state of communication connection with an access point (AP) device, outputting a search message to request information on at least one peripheral device within a specified range of the electronic apparatus as a first non-audible frequency signal based on an event to suspend communication connection with the AP device occurring, determining a device, among the electronic apparatus and the at least one peripheral device, to perform an operation of the AP device based on performance information of the at least one peripheral device included in a received response message and performance information of the electronic apparatus based on receiving the response message from the at least one peripheral device in response to the search message, and outputting information for communication connection with the electronic apparatus as a second non-audible frequency signal based on the electronic apparatus being determined as a device to perform an operation of the AP device. Accordingly, if a communication connection with an AP device connected to an electronic apparatus and a peripheral device is suspended, the electronic apparatus may rapidly form a network for communication connection with a peripheral device independently.

20 Claims, 8 Drawing Sheets

(51) Int. Cl.
*H04W 8/00* (2009.01)
*G16Y 30/00* (2020.01)

(58) Field of Classification Search
CPC ....... H04W 4/027; H04W 4/00; H04W 12/06;
H04W 4/80; H04W 84/12; H04W 76/10;
H04W 76/18; H04W 48/20
USPC ......................................................... 455/515
See application file for complete search history.

(56) References Cited

U.S. PATENT DOCUMENTS

| | | |
|---|---|---|
| 9,820,145 B2 | 11/2017 | Kim et al. |
| 9,955,369 B2 | 4/2018 | Chen et al. |
| 10,243,675 B2 | 3/2019 | Jeong et al. |
| 10,955,662 B2 | 3/2021 | Singh et al. |
| 2004/0203698 A1 | 10/2004 | Comp |
| 2014/0071942 A1 | 3/2014 | Ye |
| 2014/0146727 A1 | 5/2014 | Segev et al. |
| 2014/0323048 A1 | 10/2014 | Kang |
| 2015/0026580 A1 | 1/2015 | Kang et al. |
| 2016/0286585 A1 | 9/2016 | Choi et al. |
| 2018/0028912 A1 | 2/2018 | Campbell |
| 2020/0187300 A1 | 6/2020 | Lee et al. |

FOREIGN PATENT DOCUMENTS

| | | |
|---|---|---|
| KR | 10-1702532 | 2/2017 |
| KR | 10-2017-0104331 | 9/2017 |
| KR | 10-1801851 | 11/2017 |
| KR | 10-1831603 | 3/2018 |

ELECTRONIC APPARATUS AND METHOD FOR CONTROLLING THE ELECTRONIC APPARATUS

CROSS-REFERENCE TO RELATED APPLICATION

This application is based on and claims priority under 35 U.S.C. § 119 to Korean Patent Application No. 10-2019-0020342, filed on Feb. 21, 2019, in the Korean Intellectual Property Office, the disclosure of which is incorporated by reference herein in its entirety.

BACKGROUND

Field

The disclosure relates to an electronic apparatus and a method for controlling thereof. For example, the disclosure relates to an electronic apparatus forming a network with a peripheral device and a method for controlling thereof.

Description of Related Art

Recent development in technologies has enabled mutual data communication among a plurality of electronic apparatuses.

Specifically, at least one of a plurality of electronic apparatuses is capable of performing data communication with another electronic apparatus through a relay device such as an access point (AP) device or performing data communication by near-field wireless communication such as Bluetooth with an electronic apparatus located in the near field.

Development of Internet of Things (IoT) has led to data communication by various IoT-enabled electronic apparatuses through the same AP device.

As various electronic apparatuses are connected to each other through an AP device, there may be an event such as a network failure and disconnection of communication with an AP device due to excessively high data processing rate of a specific electronic apparatus or data processing for many electronic apparatuses at the same time.

Accordingly, when such an event occurs, there is a problem that data communication between the electronic apparatuses cannot be smoothly performed as much time is required to recover the event.

SUMMARY

Embodiments of the disclosure address the above-described necessity, and embodiments of the disclosure are provided to rapidly form a new network for data communication with a peripheral device in an electronic apparatus when a failure of a network connected to an electronic apparatus and a peripheral device occurs.

According to an example embodiment, a method for controlling an electronic apparatus includes: monitoring a state of communication connection with an access point (AP) device based on an event to suspend communication connection with the AP device occurring, outputting a search message to request information on at least one peripheral device within a specified range of the electronic apparatus as a first non-audible frequency signal based on receiving a response message from the at least one peripheral device in response to the search message, determining a device among the electronic apparatus and the at least one peripheral device, to perform an operation of the AP device based on performance information of the at least one peripheral device included in the received response message and performance information of the electronic apparatus, and based on the electronic apparatus being determined as a device to perform an operation of the AP device, outputting information for communication connection with the electronic apparatus as a second non-audible frequency signal.

The search message may include at least one of identification information, address information or performance information of the electronic apparatus, and the response message may include at least one of identification information, address information or performance information of the peripheral device.

The first non-audible frequency signal is configured to provide at least one of identification information, the address information or the performance information of the electronic apparatus using at least one of amplitude modulation, frequency modulation, or phase modulation of a non-audible frequency signal.

The outputting may include determining an intensity of the first non-audible frequency signal by adjusting a volume intensity of a speaker provided in the electronic apparatus.

The determining may include, based on receiving a third non-audible frequency signal including the response message through a microphone from a first peripheral device among the at least one peripheral device, converting the third non-audible frequency signal to a digital signal, obtaining, from the converted digital signal, performance information comprising at least one of external Internet communication accessibility information, power information, data processing information of the first peripheral device, or information on a number of peripheral devices capable of transmitting and receiving a message included in a response message of the first peripheral device, and determining a device, among the first peripheral device and the electronic apparatus, comprising information with a high priority as a device to perform an operation of the AP device by comparing performance information of the first peripheral device and the performance information of the electronic apparatus.

The first peripheral device of the at least one peripheral device may, based on receiving the first non-audible frequency signal comprising the search message, output information included in the search message and a response message comprising at least one of identification (ID) information, address information, or performance information of the first peripheral device as a non-audible frequency signal after a random delay.

The second non-audible frequency signal may include ID and password information to access the electronic apparatus using at least one of amplitude modulation, frequency modulation, or phase modulation of a non-audible frequency signal.

The method may further include, based on identifying that a first peripheral device of the at least one peripheral device performs an operation of the AP device, outputting a notification message notifying that an operation of the AP device is performed by the first peripheral device as a non-audible frequency signal, based on receiving a fourth non-audible frequency signal for communication connection with the first peripheral device from the first peripheral device, converting the fourth non-audible frequency signal to a digital signal, obtaining ID and password information for communication connection with the first peripheral device from the converted digital signal, and performing communication connection with the first peripheral device based on the obtained ID and password.

The method may further include, based on receiving a fifth non-audible frequency signal for the search message from the first peripheral device among the at least one peripheral device, after a random delay, outputting information included in the search message and a response message comprising at least one of, identification information, address information, or performance information of the electronic apparatus as a sixth non-audible frequency signal.

The method may further include, based on a suspended communication connection with the AP device with which the communication is established being resumed, outputting a notification message to disconnect communication connection as a non-audible frequency signal.

According to a another example embodiment, an electronic apparatus includes an outputter comprising output circuitry, an inputter comprising input circuitry, a communicator comprising communication circuitry configured to perform communication with an access point (AP) device, and a processor configured to: monitor a state of communication connection with the AP device, and based on an event to suspend communication with the AP device occurring, control the outputter to output a search message to request information on at least one peripheral device within a specified range of the electronic apparatus as a first non-audible frequency signal, based on receiving a response message from the at least one peripheral device in response to the search message, determine a device to perform an operation of the AP device among the electronic apparatus and the at least one peripheral device based on performance information of the at least one peripheral device included in the received response message and performance information of the electronic apparatus, and based on the electronic apparatus being determined as a device to perform an operation of the AP device, control the outputter to output information for communication connection with the electronic apparatus as a second non-audible frequency signal.

The search message may include at least one of identification information, address information, or performance information of the electronic apparatus, and the response message may include at least one of identification information, address information or performance information of the peripheral device.

The first non-audible frequency signal is configured to provide at least one of identification information, the address information or the performance information of the electronic apparatus using at least one of amplitude modulation, frequency modulation, or phase modulation of a non-audible frequency signal.

The outputter includes a speaker, and the processor is configured to determine an intensity of the first non-audible frequency signal by adjusting a volume intensity of a speaker provided in the electronic apparatus.

The inputter includes a microphone, and the processor is further configured to, based on receiving a third non-audible frequency signal including the response message through a microphone from a first peripheral device among the at least one peripheral device, convert the third non-audible frequency signal to a digital signal, obtain, from the converted digital signal, performance information comprising at least one of external Internet communication accessibility information, power information, data processing information of the first peripheral device, or information on a number of peripheral devices capable of transmitting and receiving a message including in a response message of the first peripheral device, and determine a device, between the first peripheral device and the electronic apparatus, comprising information with a high priority as a device to perform an operation of the AP device by comparing performance information of the first peripheral device and the performance information of the electronic apparatus.

The first peripheral device of the at least one peripheral device may be configured to, based on receiving the first non-audible frequency signal comprising the search message, output information included in the search message and a response message comprising at least one of identification (ID) information, address information or performance information of the first peripheral device as a non-audible frequency signal after a random delay.

The second non-audible frequency signal may include identification and password information to access the electronic apparatus using at least one of amplitude modulation, frequency modulation, or phase modulation of a non-audible frequency signal.

The processor is further configured to: based on identifying that a first peripheral device among the at least one peripheral device performs an operation of the AP device, control the outputter to output a notification message that notifies that an operation of the AP device is performed by the first peripheral device as a non-audible frequency signal, based on receiving a fourth non-audible frequency signal for communication connection with the first peripheral device from the first peripheral device, convert the fourth non-audible frequency signal to a digital signal, obtaining ID and password information for communication connection with the first peripheral device from the converted digital signal, and perform communication connection with the first peripheral device based on the obtained ID and password.

The processor is further configured to: based on receiving a fifth non-audible frequency signal for the search message from the first peripheral device among the at least one peripheral device, after a random delay, output information included in the search message and a response message comprising at least one of identification information, address information or performance information of the electronic apparatus as a sixth non-audible frequency signal.

The processor is further configured to: based on a suspended communication connection with the AP device with which the communication is established being resumed, control the outputter to output a notification message to disconnect communication connection as a non-audible frequency signal.

As described above, according to an example embodiment, if a communication connection with an AP device connected to an electronic apparatus and a peripheral device is suspended, the electronic apparatus may rapidly form a network for communication connection with a peripheral device independently.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1A:
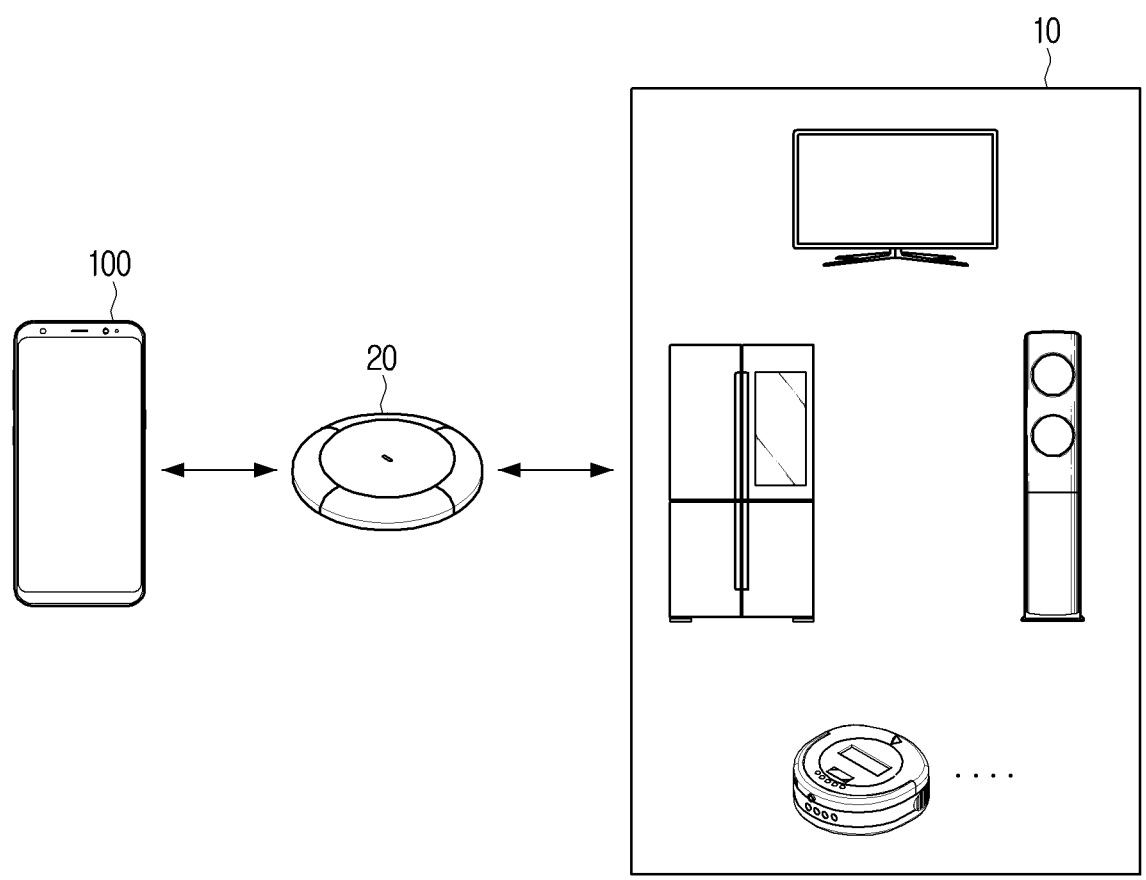
FIG. 1A is a diagram illustrating an example electronic apparatus communicatively connected to an access point (AP) device connected to a peripheral device for performing data communication according to an embodiment.

Hereinafter, various example embodiments of the disclosure will be described with reference to the accompanying drawings. However, it is to be understood that the disclosure is not limited to specific embodiments, but includes various modifications, equivalents, and/or alternatives according to embodiments of the disclosure. Throughout the accompanying drawings, similar components will be denoted by similar reference numerals.

In this disclosure, the expressions "have," "may have," "including," or "may include" may be used to denote the presence of a feature (e.g., a component, such as a numerical value, a function, an operation, a part, or the like), and does not exclude the presence of additional features.

In this disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, may be used in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily refer to "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The electronic apparatuses according to various example embodiments may include at least one of, for example, and without limitation, smartphones, tablet personal computer (PC)s, mobile phones, video telephones, artificial intelligence (AI) speaker, electronic book readers, desktop PCs, laptop PCs, netbook computers, workstations, servers, a personal digital assistant (PDA), a portable multimedia player (PMP), a moving picture experts group phase 1 or phase 2 (MPEG-1 or MPEG-2) audio layer 3 (MP3) player, a medical device, a camera, a wearable device, or the like. According to various example embodiments of the disclosure, a wearable device may include at least one of the accessory type (e.g., a watch, a ring, a bracelet, a wrinkle bracelet, a necklace, a pair of glasses, a contact lens or a head-mounted-device (HMD)), a fabric or a garment-embedded type (e.g., an electronic clothing), a body-attached type (e.g., a skin pad or a tattoo), a bio-implantable circuit, and the like. In some embodiments of the disclosure, the electronic apparatus may be a home appliance. The home appliance may include at least one of, for example, and without limitation, a television, a digital video disc (DVD) player, audio, refrigerator, air-conditioner, cleaner, ovens, microwaves, washing machines, air purifiers, set-top boxes, home automation control panels, security control panels, media box (e.g., Samsung HomeSync™, Apple TV™, or Google TV™), game consoles (e.g., Xbox™, PlayStation™), electronic dictionary, electronic key, camcorder, an electronic frame, or the like.

In another example embodiment, the electronic apparatus may include at least one of, for example, and without limitation, a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), capturing device, or ultrasonic wave device, and the like), navigation system, global navigation satellite system (GNSS), event data recorder (EDR), flight data recorder (FDR), automotive infotainment devices, marine electronic equipment (e.g., marine navigation devices, gyro compasses, and the like), avionics, security devices, car head units, industrial or domestic robots, drones, automatic teller's machine (ATM), points of sales of stores (POS), Internet of Things (IoT) devices (e.g., light bulbs, various sensors, sprinkler devices, fire alarms, thermostats, street lights, toasters, exercise equipment, hot water tanks, heater, boiler, and the like), or the like.

In this disclosure, a term user may refer to a person using an electronic apparatus or an apparatus (for example: artificial intelligence (AI) electronic apparatus) that uses an electronic apparatus.

Figure 1B:
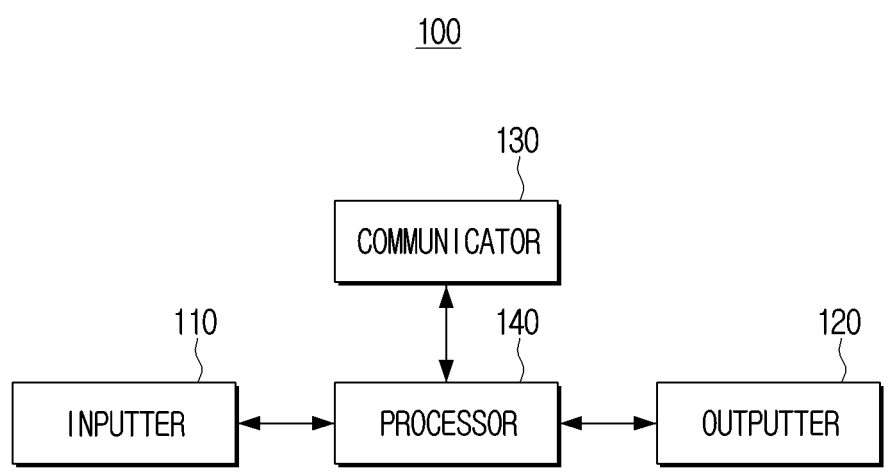
FIG. 1B is a block diagram illustrating an example electronic apparatus according to an embodiment.

FIG. 1A is diagram illustrating an example electronic apparatus communicatively connected to an access point (AP) device connected to a peripheral device for performing data communication according to an embodiment, and FIG. 1B is a block diagram illustrating an example electronic apparatus according to an embodiment.

An electronic apparatus 100 may be an apparatus located at home and may be communicatively connected to an AP device 20 for data communication.

According to an embodiment, the electronic apparatus 100 may include a display device such as a smartphone, a smart TV, a digital video disc (DVD) player, a tablet personal computer, or the like, or a smart home appliance such as a smart refrigerator, a smart air-conditioner, a robot cleaner, an oven, a microwave, a smart washing machine, or the like.

The electronic apparatus 100 may, for example, be an AI speaker for controlling an operation of a display device and a smart electronic apparatus.

In the disclosure, a portable terminal device such as a smartphone is categorized as the electronic apparatus 100 and an electronic apparatus such as a smart TV, a smart air-conditioner, a smart refrigerator, and a robot cleaner as a peripheral device 10.

As illustrated in FIG. 1A, the electronic apparatus 100, when connected to the AP device 20, may perform data communication with the peripheral device 10 communicatively connected to the AP device 20 or an external device (not shown) such as a content server providing a content.

The electronic apparatus 100 may include an inputter (e.g., including input circuitry) 110, an outputter (e.g., including output circuitry) 120, a communicator (e.g., including communication circuitry) 130, and a processor (e.g., including processing circuitry) 140 as illustrated in FIG. 1B.

The inputter 110 may include various input circuitry and receives a response message from the electronic apparatus 100 and at least one peripheral device 10 located around (e.g., within a specified ranged of) the electronic apparatus 100. The inputter 110 may include various input circuitry, including, for example, a microphone 111 (see, e.g., FIG. 2), and a response message may be included in a non-audible frequency signal. The inputter 110 may receive a non-audible frequency signal that includes a response message from the at least one peripheral device 10 through the microphone 111.

The outputter 120 may include various output circuitry and transmits a search message for requesting information about the electronic apparatus 100 and at least one peripheral device 10 located around the electronic apparatus 100. For example, the outputter 120 may output a search message for requesting information about the electronic apparatus 100 and at least one peripheral device 10 located within a specified range of the electronic apparatus 100 as the non-audible frequency signal through the speaker 121 (see, e.g., FIG. 2).

The communicator 130 may include various communication circuitry and communicate with the AP device 20 in a wireless or wired manner, and may transmit and/or receive data to and from an external device (not shown) and at least one peripheral device 10 through the communicatively connected AP device 20. The at least one peripheral device 10 may be an electronic apparatus 100 as described herein. In the disclosure, the peripheral device 10 is described to be distinguished from the electronic apparatus 100.

The processor 140 may include various processing circuitry and monitors a state of a communication connection with the AP device 20.

When the processor 140 is communicatively connected to the AP device 20, the processor 140 periodically monitors whether communication with the AP device 20 is normal. When an event to suspend communication connection with the AP device 20 occurs through monitoring, the processor 140 may control the outputter 120 to output a search message for requesting information on at least one peripheral device 10 present in the vicinity of the electronic apparatus 100 as a non-audible frequency signal (hereinafter, a first non-audible frequency signal).

The event to suspend communication connection with the AP device 20 may include an event of losing access connection with an external Internet network, an event of Signal to (Interface) and Noise Ratio (S(I)NR) event, a data throughput event, an event of inactivating a wireless communication module, or the like.

The event of losing access connection with the external Internet network may include overload cloud server (not shown), Internet network error, a failure of the network equipment, or the like.

The S(I)NR event may, for example, be an event according to a signal interference due to the AP device 20, a connection error occurring over a communication range between the electronic apparatus 100 and the AP device 20, a radio channel characteristic in which a communication error occurs according to the simultaneous use of a limited frequency channel that can be used within the assigned frequency band, or the like.

The data throughput event may, for example, be an event in which data processing speed requested by a plurality of peripheral devices 10 is reduced, when the AP device 20 performs data processing of a plurality of peripheral devices 10 at the same time.

The data throughput event may be an event where the possession of data processing of the particular peripheral device 10 performed by the AP device 20 is high, the data processing of the remaining peripheral devices 10 is not smoothly performed, so that the data processing speed requested by the plurality of peripheral devices 10 can be degraded.

The event in which the wireless communication module is not activated is an event in which the wired communication network is used by the electronic apparatus 100 or the peripheral device 10 or the AP is not set in the electronic apparatus 100 or the peripheral device 10.

The processor 140 may determine a communication connection state with the AP device 20 based, for example, on the event as described above.

The processor 140 may determine that the communication connection with the AP device 20 is suspended when the response signal of the AP device 20 is not received within a predetermined threshold time through the communicator 130.

When the S(I)NR value for the response signal of the AP device 20 received through the communicator 130 is greater than or equal to a predetermined threshold value, the processor 140 may determine that the communication with the AP device 20 is suspended.

When the speed of data processing performed by the AP device 20 is less than a preset threshold speed, the processor 140 may determine that communication connection with the AP device 20 is suspended.

If it is determined that the communication connection with the AP device 20 has been suspended, the processor 140 may control the outputter 120 to output a first non-audible frequency signal that includes a search message for requesting information about at least one peripheral device 10 present around the electronic apparatus 100. Accordingly, the outputter 120 may output a first non-audible frequency signal including a search message through the speaker 121.

The search message may include, for example, at least one of identification information, address information, and performance information, or the like, of the electronic apparatus 100. The identification information may be intrinsic identification (ID) information to identify the electronic apparatus 100 and the address information may be internet protocol (IP) address to access the electronic apparatus 100.

The performance information of the electronic apparatus 100 may include at least one of power information indicative of a power budget of the electronic apparatus 100, data processing information including at least one of a central processing unit (CPU) processing speed, a CPU throughput, and a random-access memory (RAM) version, information on the number of peripheral devices 10 capable of transmitting and receiving messages, external Internet accessibility information, and artificial intelligence (AI) supportability information.

The first non-audible frequency signal including the search message may provide a search message including at least one of the identification information of the electronic apparatus 100, the address information, and the performance information of the electronic apparatus 100 using at least one of amplitude modulation, frequency modulation, and phase modulation of the non-audible frequency signal.

The electronic apparatus 100 may be at least one peripheral device 10 as described above. The at least one peripheral device 10 including the electronic apparatus 100 connected to the AP device 20 may monitor whether communication with the AP device 20 is connected.

The processor 140 controlling the outputter 120 to output the first non-audible frequency signal including the search message through the speaker 121 may determine intensity of the first non-audible frequency signal by adjusting the volume intensity of the speaker 121.

For example, when the volume intensity of the speaker 121 is set to a first level, the outputter 120 may output the first non-audible frequency signal in a range corresponding to the first level through the speaker 121 that is set to the first level volume intensity.

When the volume intensity of the speaker 121 is set to a second level that is higher than the first level, the outputter 120 may output the first non-audible frequency signal in a range wider than the range corresponding to the first level through the speaker 121 that is set to the second level volume intensity.

A peripheral device (hereinafter first peripheral device) within a range corresponding to the volume intensity of the speaker 121, among at least one peripheral devices 10, may receive the first non-audible frequency signal that is output from the electronic apparatus 100.

When the first non-audible frequency signal is received, the first peripheral device 11 (see, e.g., FIG. 6) may output a non-audible frequency signal (hereinafter third non-audible frequency signal) including a response message based on a search message included in the received first non-audible frequency signal.

Accordingly, the inputter 110 may receive the third non-audible frequency signal including a response message that is output from the first peripheral device 11 through the microphone 111.

When the third non-audible frequency signal is received, the processor 140 may determine whether still another non-audible frequency signal is received within a preset threshold time after the third non-audible frequency signal is received.

As a result of the determination, if still another non-audible frequency signal is not received within a predetermined threshold time, the processor 140 determines a device (hereinafter SoftAP device) which is to perform the same operation as the AP device 20, between the electronic apparatus 100 and the first peripheral device 10, based on the performance information of the first peripheral device 11 and the performance information of the electronic apparatus 100, from the response message included in the received third non-audible frequency signal.

The response message may include at least one of the identification information and address information of the first peripheral device 10 and the performance information of the first peripheral device 11.

The performance information of the first peripheral device 10 may include at least one of processing information including at least one of power budget information, CPU processing speed, CPU throughput, and RAM version of the first peripheral device 10, the number of peripheral devices 10 capable of transmitting and receiving messages, external Internet accessibility information, and artificial intelligence (AI) supportability information.

When the electronic apparatus 100 is determined as the SoftAP device based on the performance information of the first peripheral device 11 and the performance information of the electronic apparatus 100, the processor 140 controls the outputter 120 to output the information for the communication connection with the electronic apparatus 100 as the second non-audible frequency signal.

The outputter 120 may output the second non-audible frequency signal including a response message through the speaker 121.

The second non-audible frequency signal may be a signal to provide ID and password information for connecting to the electronic apparatus 100 determined as the SoftAP device using at least one of amplitude modulation, frequency modulation, and phase modulation of the non-audible frequency signal.

When the second non-audible frequency signal output from the electronic apparatus 100 is received, the first peripheral device 11 among the at least one peripheral device 10 may convert the received second non-audible frequency signal into a digital signal, and obtain ID and password information for accessing the electronic apparatus 100 from the converted digital signal. The ID information may be, for example, service set identifier (SSID) information.

The first peripheral device 11 may further include media access control (MAC) address information for communicating with the electronic apparatus 100 and product information of the electronic apparatus 100, or the like, from the second non-audible frequency signal converted to the digital signal.

When the information is obtained, the first peripheral device 11 may perform communication connection with the electronic apparatus 100 based on the obtained ID and password information.

The first peripheral device 11, which is in communication with the electronic apparatus 100 determined as the SoftAP device, periodically monitors whether the communication connection is resumed with the AP device 20 of which communication has been suspended. When the communication connection with the AP device 20 is resumed through monitoring, the first peripheral device 11 outputs a notification message for disconnecting communication with the electronic apparatus 100 as the non-audible frequency signal.

When the notification message for disconnecting communication output from the first peripheral device 11 is received as the non-audible frequency signal, the processor 140 suspends communication connection with the first peripheral device 11 and controls the outputter 120 to resume communication with the AP device 20.

The embodiment is not limited thereto, and after the electronic apparatus 100 has been determined to be the SoftAP device, the processor 140 periodically monitors whether the communication connection with the AP device 20 which was suspended is resumed. When the communication connection with the AP device 20 is resumed through monitoring, the processor 140 controls the outputter 120 to output a notification message for communication disconnection with the electronic apparatus 100 as a non-audible frequency signal.

The outputter 120 outputs the non-audible frequency signal including a notification for disconnecting communication with the electronic apparatus 100 through the speaker 121.

When the non-audible frequency signal including a notification message for disconnecting communication with the electronic apparatus 100 is received, the first peripheral device 10 may suspend communication connection with the electronic apparatus 100 and resume communication with the AP device 20.

Hereinbelow, an operation to determine a device to perform an operation as the SoftAP device among the first peripheral device 11 and the electronic apparatus 100 to which the response message is transmitted by the processor 140 will be described in a greater detail.

As described above, when communication connection with the AP device 20 is suspended, the processor 140 outputs the first non-audible frequency signal including a search message for requesting information on at least one peripheral device 10 within a specified range of the electronic apparatus 100 through the outputter 120.

The first peripheral device 11 among the at least one peripheral devices 10 may receive the first non-audible frequency signal output from the electronic apparatus 100. When the first non-audible frequency signal is received, the first peripheral device 11 outputs a third non-audible frequency signal including a response message.

The response message may include identification information and address information of the first peripheral device 11, and performance information of the first peripheral device 11. The performance information of the first peripheral device 11 may include at least one of power information indicating a power budget of the first peripheral device 11, data processing information including at least one of a CPU processing speed, a CPU throughput and a RAM version, the number of peripheral devices 10 capable of transmitting and receiving a message, external Internet accessibility information, and artificial intelligence (AI) supportability information.

When the third non-audible frequency signal including the response message is received through the microphone 111, the processor 140 converts the received third non-audible frequency signal to a digital signal.

The processor 140 may obtain the performance information of the first peripheral device 11 included in the response message of the first peripheral device 11 from the converted digital signal.

The processor 140 may compare the performance information of the first peripheral device 11 and the performance information of the electronic apparatus 100.

As described above, the performance information of the first peripheral device 11 may include at least one of power information indicating a power budget of the first peripheral device 11, data processing information including at least one of CPU processing speed, CPU throughput, and RAM version, number of peripheral devices 10 capable of transmitting and receiving messages, external Internet accessibility information, artificial intelligence (AI) supportability information.

The performance information of the electronic apparatus 100 may include at least one of power information indicating a power budget of the first peripheral device 11, data processing information including at least one of a CPU processing speed, a CPU throughput, and a RAM version, the number of peripheral devices 10 capable of transmitting and receiving messages, external Internet accessibility information, and artificial intelligence (AI) supportability information.

The processor 140 may compare the performance information of the first peripheral device 11 and the performance information of the electronic apparatus 100 and determine a device including information with high priority, among the first peripheral device 10 and the electronic apparatus 100, as the SoftAP device.

According to an embodiment, the processor 140 may determine a device including information corresponding to a priority among the information included in performance in formation of each of the first peripheral device 11 and the electronic apparatus 100 as the SoftAP device.

For example, the information included in the performance information may have a set priority in the order of power information, data processing information, the number of peripheral devices 10, externa Internet accessibility information, and AI supportability information.

The performance information of the first peripheral device 11 may include remaining information except the external Internet accessibility information, and the performance information of the electronic apparatus 100 may include remaining information except the AI supportability information.

The processor 140 may determine the electronic apparatus 100 including external Internet accessibility information among the first peripheral device 11 and the electronic apparatus 100 as the SoftAP device according to the priority condition.

According to another embodiment, based on the information included in the performance information of each of the first peripheral device 11 and the electronic apparatus 100, if each of the first peripheral device 11 and the electronic apparatus 100 includes the same information corresponding to the priority or does not include information corresponding to the priority, the processor 140 may determine a device which satisfies a predetermined condition as the SoftAP device.

For example, the power information and the data processing information included in the performance information are used as information for determining whether a predetermined condition is satisfied, and the number information of the peripheral device 10, the external Internet accessibility information, and the AI supportability information, which are the remaining information, may be prioritized in a listed order.

The performance information of each of the first peripheral device 11 and the electronic apparatus 100 may include the same information corresponding to the priority.

The processor 140 may determine that the information, among information included in performance information of each of the first peripheral device 11 and the electronic apparatus 100, corresponding to the priority is the same, and determine a device satisfying a predetermined condition between the first peripheral device and the electronic apparatus 100 as the SoftAP device.

The processor 140 may refer to the power information included in the performance information of each of the first peripheral device 11 and the electronic apparatus 100 and determine a device having a more remaining battery, between the first peripheral device 10 and the electronic apparatus 100, as the SoftAP device.

The processor 140 may refer to the data processing information included in performance information of each of the first peripheral device and the electronic apparatus 100 and determine a device having a faster CPU processing speed and a less CPU usage between the first peripheral device and the electronic apparatus 100 as the SoftAP device.

The processor 140 may combine the power information and the data processing information included in performance information of each of the first peripheral device and the electronic apparatus 100 and determine one of the first peripheral device and the electronic apparatus 100 as the SoftAP device.

The processor 140 may refer to the power information included in performance information of each of the first peripheral device and the electronic apparatus 100 and determine a device having a remaining battery greater than equal to a predetermined threshold value between the first peripheral device and the electronic apparatus 100 as the SoftAP device.

If the remaining battery amount of each of the first peripheral device 11 and the electronic apparatus 100 is greater than or equal to a predetermined threshold value, the processor 140 may determine a device having a high CPU processing speed a device having a small amount of use of CPU among the first peripheral device 11 and the electronic apparatus 100 and of the CPU as the SoftAP device by referring to the data processing information included in the performance information of each of the first peripheral device 11 and the electronic apparatus 100.

According to another embodiment, the processor 140 may determine a device that includes information corresponding to the priority as the SoftAP device if a predetermined condition is satisfied based on information included in the performance information of each of the first peripheral device 11 and the electronic apparatus 100.

For example, the power information and the data processing information included in the performance information are used as information for determining whether a predetermined condition is satisfied, and the number information of the peripheral device 10, the external Internet accessibility information, and the AI supportability information, which are the remaining information, can be prioritized in the listed order.

The processor 140 may determine whether the remaining battery amount of each of the first peripheral device 11 and the electronic apparatus 100 is greater than or equal to 30% (hereinafter first condition) referring to power information included in the performance information of each of the first peripheral device 11 and the electronic apparatus 100.

In addition, the processor 140 may determine whether the processing speed of the CPU corresponding to each of the first peripheral device 11 and the electronic apparatus 100 is greater than or equal to a predetermined threshold speed and the corresponding CPU usage is less than a preset threshold value (hereinafter second condition) by referring to the data processing information included in the performance information of each of the first peripheral device 11 and the electronic apparatus 100.

As a result of determination, if it is determined that the electronic apparatus 100 between the first peripheral device 11 and the electronic apparatus 100 satisfies both the first condition and the second condition, the processor 140 may determine the electronic apparatus 100 as the SoftAP device.

When it is determined that both the first peripheral device 11 and the electronic apparatus 100 satisfy the first condition and the second condition, the processor 140 determines whether performance information of each of the first peripheral device 11 and the electronic apparatus 100 includes the information that is determined based on the priority.

As described above, the priority may be set in the order of the information on the number of the peripheral device 10, the external Internet accessibility information, and AI supportability information.

The performance information of the first peripheral device 11 may include other information except the external Internet accessibility information among the information corresponding to the priority, and the performance information of the electronic apparatus 100 may include all the information corresponding to the priority.

The processor 140 may determine the electronic apparatus 100 as the SoftAP device.

When the electronic apparatus 100 is determined as the SoftAP device, the processor 140 controls the outputter 120 to output information for communication connection with the electronic apparatus 100 as the second non-audible frequency signal.

Accordingly, the outputter 120 outputs the second non-audible frequency signal through the speaker 121. When the second non-audible frequency signal output from the electronic apparatus 100 is received, the first peripheral device 11 may convert the received second non-audible frequency signal into a digital signal, and obtain the ID and password information for accessing the electronic apparatus 100 determined as the SoftAP device from the converted digital signal.

The first peripheral device 11 may perform communication connection with the electronic apparatus 100 determined as the SoftAP device based on the obtained ID and password information.

According to an additional aspect, if the first non-audible frequency signal including the search message is received from the electronic apparatus 100, the at least one peripheral device 10 outputs a response message including at least one of the information included in the search message after the random delay, the identification information and address information of the first peripheral device 11, and the performance information of the first peripheral device 11 as the non-audible frequency signal.

The non-audible frequency signal including the response message may be the third non-audible frequency signal as described above.

The electronic apparatus 100 may receive the third non-audible frequency signal including the output response message from the first peripheral device 11 as described above.

In addition, a second peripheral device 12 (see, e.g., FIG. 6) located within a specified range of the first peripheral device 11 may receive the third non-audible frequency signal that includes a response message output from the first peripheral device 11. The second peripheral device 12 can be a device located at a position in which reception of the first non-audible frequency signal including a search message output from the electronic apparatus 100 is impossible and the reception of the third non-audible frequency signal including a response message output from the first peripheral device 11 is possible.

When the third non-audible frequency signal including the response message output from the first peripheral device 11 is received, the second peripheral device 12 may output the non-audible frequency signal including the response message.

The response message may include at least one of the information included in the response message of the non-audible frequency signal output from the first peripheral device 11, identification information and address information of the second peripheral device 12, and the performance information of the second peripheral device 12.

When the non-audible frequency signal output from the second peripheral device 12 is received, the first peripheral device 11 obtains a response message included in the received non-audible frequency and determines whether the information related to the first peripheral device 11 is included with reference to the information included in the obtained response message. As a result of the determination, if the information related to the first peripheral device 11 is included, the first peripheral device 11 outputs a response message obtained from the non-audible frequency signal received from the second peripheral device 12 as a third non-audible frequency signal.

When the third non-audible frequency signal is received through the inputter 110, the processor 140 may obtain a response message included in the received third non-audible frequency signal. Thereafter, the processor 140 compares the performance information of the first and second peripheral devices 11 and 12 included in the obtained response message with the performance information of the electronic apparatus 100 and determines a device to be operated as the SoftAP device.

The operation to determine the SoftAP has been described in detail above and thus may not be further described.

When the electronic apparatus 100 is determined as the SoftAP device, the processor 140 outputs the second non-audible frequency signal including information for communication connection with the electronic apparatus 100 through the outputter 120.

The first peripheral device 11 located in a range capable of receiving the second non-audible frequency signal output from the electronic apparatus 100 may perform communication connection with the electronic apparatus 100 based on information (ID and password) included in the received second non-audible frequency signal.

When the second non-audible frequency signal output from the electronic apparatus 100 is received, the first peripheral device 11 may output the non-audible frequency signal including information for communication connection with the electronic apparatus 100 of the first peripheral device 11 and the identification information of the first peripheral device 11.

The first peripheral device 11 and the second peripheral device 12 which is located at a range that is capable of transmitting and receiving the non-audible frequency signal may perform communication connection with the electronic apparatus 100 based on the information included in the received second non-audible frequency signal.

When the first peripheral device 11, among at least one peripheral device 10, is determined to perform an operation of the SoftAP device through the aforementioned embodiment, the processor 140 controls the outputter 120 to output a notification message notifying that the operation of the SoftAP device is performed by the first peripheral device 110 as the non-audible frequency signal.

The outputter 120 may output the non-audible frequency signal including a notification message through the speaker 121.

When the non-audible frequency signal including the notification message notifying that the operation of the SoftAP device is performed by the first peripheral device 11 is received from the electronic apparatus 100, the first peripheral device 11 outputs a fourth non-audible frequency signal for communication connection with the first peripheral device 11.

When the fourth non-audible frequency signal is received from the first peripheral device 11, the processor 140 may convert the received fourth non-audible frequency signal to a digital signal and obtain the ID and password for communication connection with the first peripheral device 11 from the converted digital signal. The processor 140 then may perform communication connection with the first peripheral device 11 based on the obtained ID and password for communication connection with the first peripheral device 11.

The second peripheral device 12 which is at a position that is not capable of transmitting and receiving the non-audible frequency signal with the electronic apparatus 100 and capable of transmitting and receiving the non-audible frequency signal with the first peripheral device 11 may receive the fourth non-audible frequency signal output from the first peripheral device 11. As the fourth non-audible frequency signal is received, the second peripheral device 12 may obtain the ID and password for communication connection with the first peripheral device 11 from the fourth non-audible frequency signal as described above and perform communication connection with the first peripheral device 11 based on the obtained ID and password.

When the fifth non-audible frequency signal including a search message to request information on at least one peripheral device 10 is received from the first peripheral device 11 among at least one peripheral device 10, the processor 140, after random delay, controls the outputter 120 to output a response message including at least one of the identification information of the electronic apparatus 100 and the performance information of the electronic apparatus 100 as the sixth non-audible frequency signal.

The outputter 120 may output a response message including at least one of the identification information of the electronic apparatus 100 and the performance information of the electronic apparatus 100 as the sixth non-audible frequency signal through the speaker 121, after random delay.

The first peripheral device 11, when a sixth non-audible frequency signal is received from the electronic apparatus 100, may determine one of the electronic apparatus 100 and the first peripheral device 11 as the SoftAP device through the embodiment described above.

Hereinbelow, a specific configuration of the electronic apparatus 100 will be described in greater detail.

Figure 2:
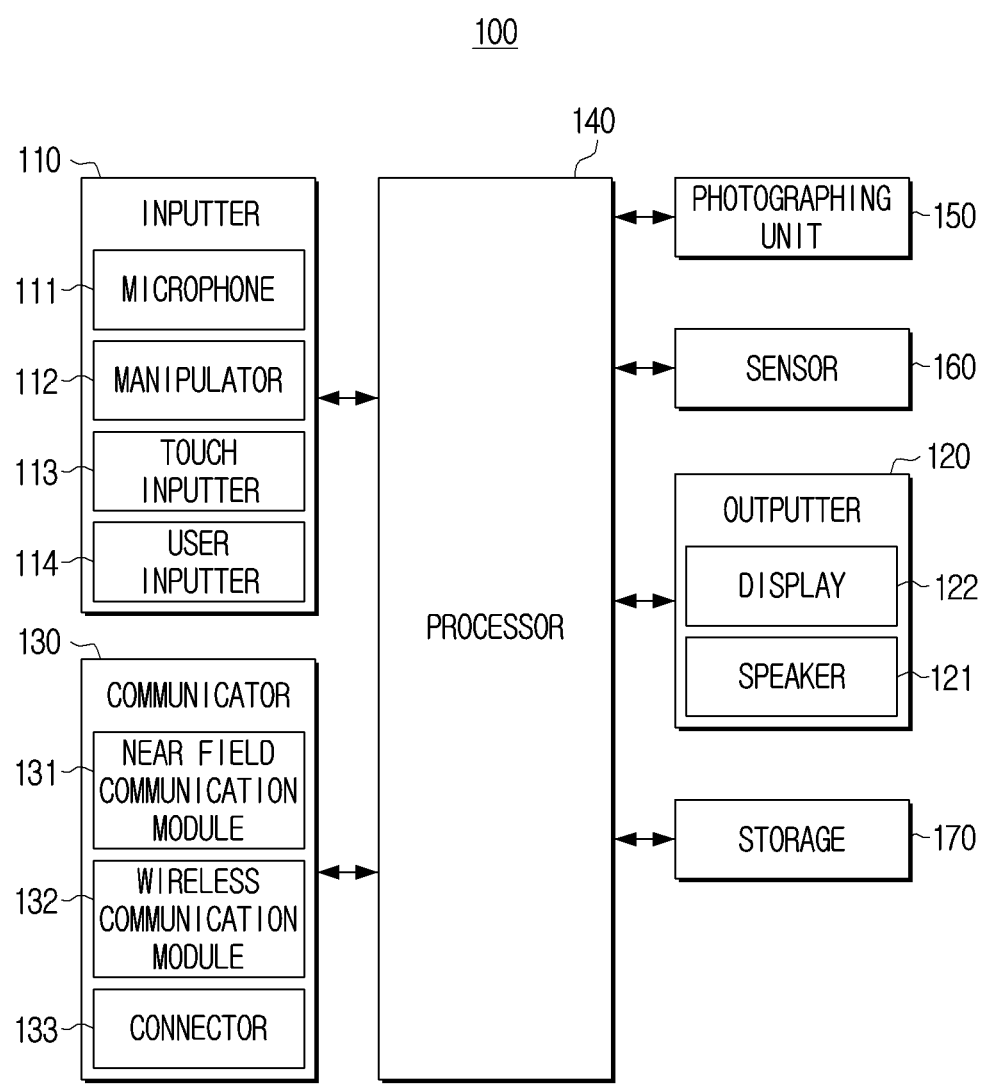
FIG. 2 is a block diagram illustrating an example electronic apparatus according to an embodiment.

FIG. 2 is a block diagram illustrating an example electronic apparatus according to an embodiment.

The electronic apparatus 100 described above may be various smart devices such as a smart television (TV), a smartphone, a tablet PC, an AI speaker capable of controlling a smart device, or the like, but is not limited thereto.

In the disclosure, it will be described that the electronic apparatus 100 is a smart device for convenience of description.

The inputter 110 may include various input circuitry and receive not only the non-audible frequency signal output from at least one peripheral device 10 but also receive various user commands, and transmit the same to the processor 140.

The inputter 110 may include various input circuitry including, for example, and without limitation, a microphone 111, a manipulator 112, a touch inputter 113, and a user inputter 114.

The microphone 111 may receive the non-audible frequency signal from the at least one peripheral device 10 or receive a user's voice command.

The manipulator 112 may be implemented as a key pad including various function keys, number keys, special keys, character keys, or the like.

When a display 122 which will be described later is implemented as a touch screen, the touch inputter 113 may be implemented as a touch pad making a mutual layer structure with the display 122. The touch inputter 113 may receive a selection command for an icon related to various applications displayed through the display 122.

The user inputter 114 may receive an infrared (IR) signal or radio frequency (RF) signal for controlling an operation of the electronic apparatus 100 from a remote control device (not shown).

The outputter 120 may include various output circuitry including, for example, and without limitation, the speaker 121 and the display 122 as illustrated in FIG. 2.

The speaker 121 may output the corresponding non-audible frequency signal to output the non-audible frequency signal to at least one peripheral device 10 as described above.

The speaker 121 may output audio data of the multimedia content. The speaker 121 is configured to output various notification sounds or a voice message as well as various audio data for which various processing jobs such as decoding, amplification, noise filtering, or the like, are performed by an audio processor (not shown).

The display 122 may output video data of the multimedia content image processed by the image processor (not shown). The display 122 may display an execution screen including an icon for executing each of a plurality of applications stored in the storage 170 to be described later or various user interface (UI) screens for controlling an operation of the electronic apparatus 100.

The display 122 may be implemented as a liquid crystal display (LCD), an organic light emitting display (OLED), or the like.

The display 122 may be coupled to at least one of a front area, a side area, and a back area of the electronic apparatus 100 in a flexible display format.

A flexible display may be characterized as being bent, curbed, or rolled without damage through a thin, flexible substrate, such as paper. Such flexible displays may be manufactured using plastic substrates as well as glass substrates commonly used. When using a plastic substrate, the substrate can be formed using a processor manufactured at a low temperature without using an existing processor to prevent damage to the substrate. In addition, a glass substrate that surrounds a flexible liquid crystal can be replaced with a plastic film to impart a foldable flexibility. The flexible display has advantages that it may be made thin, lightweight, impact-resistive, and may be manufactured in various shapes such as being bent and curved.

The communicator 130 may include various communication circuitry and performs data communication with a peripheral device (not shown) such as a smart TV, a smartphone, a tablet PC, a content server (not shown), or the like.

The communicator 130 may include various communication circuitry including, for example, and without limitation, a connector 133 including at least one of a wireless communication module 132, and a near field communication module 131 and a wired communication module such as high-definition multimedia interface (HDMI), universal serial bus (USB), institute of electrical and electronics engineers (IEEE) 1394, or the like.

The near field communication module 131 may include various near-field communication circuitry and may be configured to perform near field communication with a peripheral device located at a near distance from the electronic apparatus 100 wirelessly. The near field communication module 131 may include at least one of a Bluetooth module, infrared data association (IrDA) module, near field communication (NFC) module, WI-FI module, and Zigbee module.

The wireless communication module 132 may include various wireless communication circuitry and may be a module to be connected to an external network through the AP device 20 according to wireless communication protocol such as IEEE for performing communication. The wireless communication module may further include a mobile communication module for connecting to a mobile communication network according to various mobile communication specification for performing communication such as $3^{rd}$ generation (3GT), $3^{rd}$ generation partnership project (3GPP), long term evolution (LTE), or the like.

The communicator 130 may be implemented as various near field communication method and may employ other communication technology not mentioned in the disclosure if necessary.

The connector 133 is configured to provide interface with various source devices such as USB 2.0, USB 3.0, HDMI, IEEE 1394, or the like. The connector 133 may receive data related to multimedia content transmitted from a content server (not shown) through a wired cable connected to the connector 133 according to a control command of the processor 140, or transmit data related prestored multimedia content to an external recordable medium. The connector 133 may receive power from a power source through a wired cable physically connected to the connector 133.

A photographing unit 150 may include a camera for photographing an external environment of the electronic apparatus 100. In this example, the photographing unit 150 may include a lens (not shown) through which an image is transmitted and an image sensor (not shown) for sensing an image transmitted through the lens. The image sensor (image) may be implemented with a charge-coupled device (CCD) image sensor or a complementary metal oxide semiconductor (CMOS) image sensor. The image data obtained through the photographing unit 150 may be processed by an image processor (not shown).

The sensor 160 may include various sensors and/or sensing circuitry and may sense a motion of the electronic apparatus 100. The sensor 160 may include, for example, and without limitation, an accelerometer sensor, a magnetic sensor, a gyroscope sensor, or the like, and sense a motion of the electronic apparatus 100 using various sensors.

The accelerometer sensor is a sensor for measuring acceleration or intensity of shock of a moving electronic apparatus 100 and is an essential sensor that is used for various transportation means such as a vehicle, a train, an airplane, or the like, and a control system such as a robot as well as the electronic apparatuses such as a smartphone and a tablet PC.

The magnetic sensor is an electronic compass capable of sensing azimuth using earth's magnetic field, and may be used for position tracking, a three-dimensional (3D) video game, a smartphone, a radio, a global positioning system (GPS), a personal digital assistant (PDA), a navigation device, or the like.

The gyroscope sensor is a sensor for applying rotation to an existing accelerometer to recognize a six-axis direction for recognizing a finer and precise operation.

The storage 170 may store a multimedia content and an operating program for controlling an operation of the electronic apparatus 100, or the like, as described above.

If the electronic apparatus 100 is turned on, the operating program may be a program that is read from the storage 170 and compiled to operate each configuration of the electronic apparatus 100. The storage 170 may be implemented as at least one of a read only memory (ROM), a random access memory (RAM), or a memory card (for example, secure digital (SD) card, memory stick) detachable to the electronic apparatus 100, non-volatile memory, volatile memory, hard disk drive (HDD), or solid state drive (SSD).

The processor 140 described above may include various processing circuitry and control overall operation of the electronic apparatus 100 or may be a processor that is capable of controlling overall operation of the electronic apparatus 100.

The processor 140 may be coupled to the above configurations and may be implemented as a system-on-a-chip (system on chip, SOC, SoC).

Each configuration of the electronic apparatus 100 forming network with at least one peripheral device 10, when communication connection with the AP device 20 is disconnected, has been described in greater detail. Hereinafter, a method for forming a network with at least one peripheral device 10 in the electronic apparatus 100 will be described in detail when a communication connection with the AP device 20 according to the embodiment is suspended.

Figure 3:
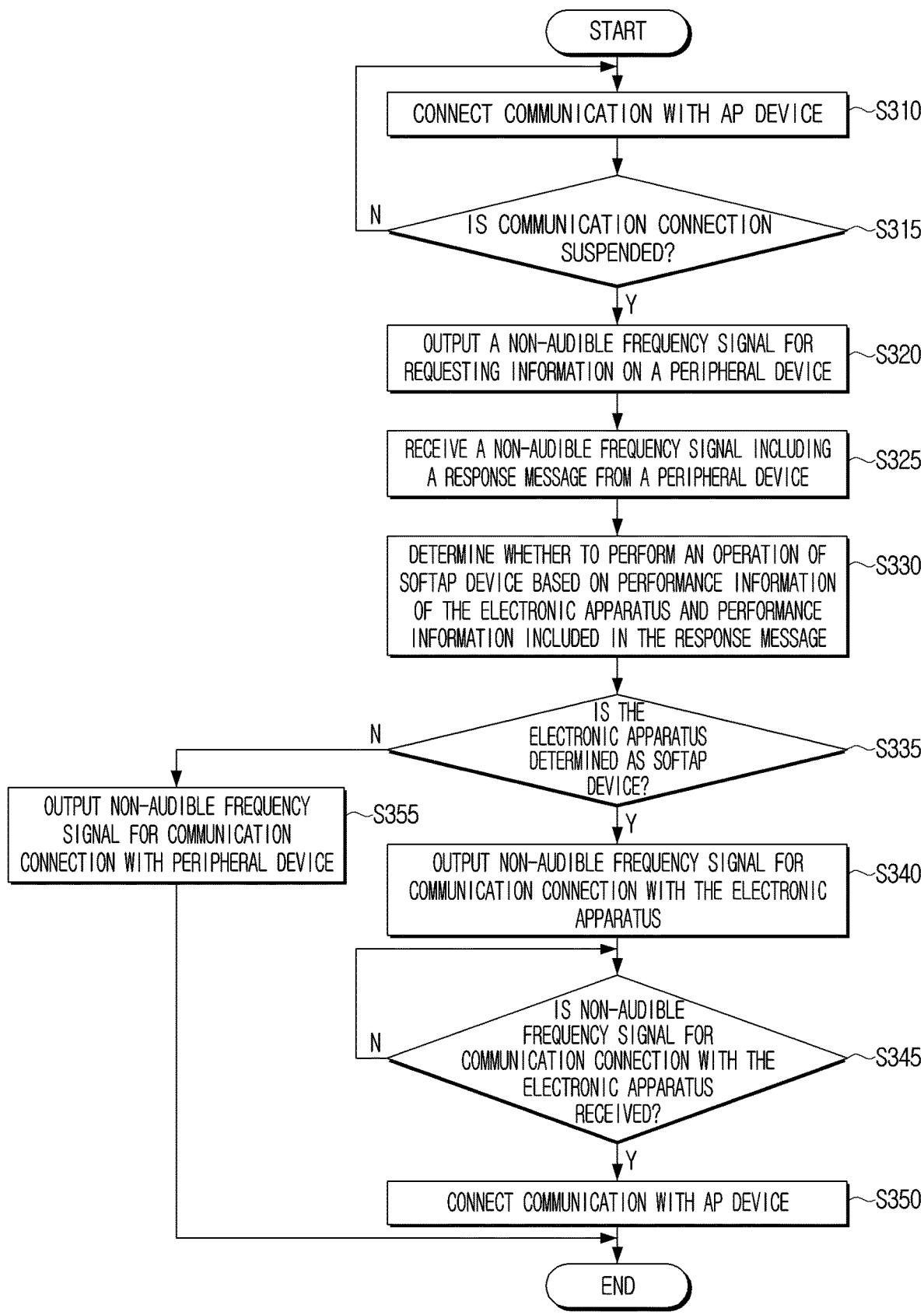
FIG. 3 is a flowchart illustrating an example method for forming a network with a peripheral device according to an embodiment.

FIG. 3 is a flowchart illustrating an example method for forming a network with a peripheral device according to an embodiment.

As illustrated in FIG. 3, the electronic apparatus 100 performs communication connection with the AP device 20 in operation S310. The electronic apparatus, then, monitors a communication connection state with the AP device 20 to determine whether there is an event to suspend communication with the AP device 20 in operation S315.

When the event in which communication connection with the AP device 20 is suspended may be an event where access connection with the external Internet network is lost, the S(I)NR event, the data throughput event, and an event in which a wireless communication module is not activated, or the like.

If it is determined that the event in which the communication connection with the AP device 20 has been suspended occurs, the electronic apparatus 100 outputs a search message for requesting information about at least one peripheral device 10 existing around (e.g., within a specified range of) the electronic apparatus 100 as a non-audible frequency signal (hereinafter, referred to as the first non-audible frequency signal) in operation S320.

The search message may include at least one of the identification information and address information of the electronic apparatus 100 and the performance information of the electronic apparatus 100.

The performance information of the electronic apparatus 100 may include at least one of power information indicating a power budget of the electronic apparatus 100, data processing information including at least one of CPU processing speed, CPU throughput, and available memory capacity, number information of the peripheral device 10 capable of transmitting and receiving messages among the peripheral devices 10 where the communication connection with the AP device 20 is suspended, external Internet accessibility information, and artificial intelligence (AI) supportability information.

The first non-audible frequency signal including the search message may provide a search message including at least one of identification information and address information of the electronic apparatus 100 and the performance information of the electronic apparatus 100 using at least one of amplitude modulation, frequency modulation, and phase modulation of the non-audible frequency signal.

A method of providing information using amplitude modulation (AM) of the non-audible frequency signal is to diversify amplitude of a carrier wave according to the size of a signal wave, includes information to the amplitude of the diversified carrier wave, and transmits the same.

A method of providing information using frequency modulation (FM) of the non-audible frequency signal is to diversify frequency while maintaining amplitude to be constant according to the size of the signal wave and provide information.

A method of providing information using phase modulation (PM) of the non-audible frequency signal is to make alternating signal having a constant frequency have non-overlapped phase according to an input signal and transmit information by the different phase. The electronic apparatus 100 may determine the intensity of the first non-audible frequency signal including a search message by adjusting volume intensity of the speaker provided in the electronic apparatus 100.

The at least one peripheral device 10 that is within a range corresponding to the volume intensity may, when the first non-audible frequency signal is received, output a non-audible frequency signal (hereinafter, third non-audible frequency signal) including a response message based on a search message included in the received first non-audible frequency signal.

The response message may include at least one of the identification information and address information of the peripheral device 10 and the performance information of the peripheral device 10.

The performance information of the peripheral device 10 may include at least one of the power budget information, processing information including at least one of CPU processing speed, CPU throughput, and RAM version, information on the number of peripheral device 10 capable of transmitting and receiving a message, external Internet accessibility information, AI supportability information.

When the third non-audible frequency signal is received, the electronic apparatus 100 may obtain a response message included in the third non-audible frequency signal and determine a device to perform an operation of the SoftAP device, between the electronic apparatus 100 and the first peripheral device 10, based on the performance information of the first peripheral device 11 and the performance information of the electronic apparatus 100 included in the obtained response message in operations S325 and S330.

Ahead of performing the step S330, the electronic apparatus 100 may determine whether another non-audible frequency signal is received within a preset threshold time after the third non-audible frequency signal is received.

As a result of determination, when still another non-audible frequency signal is not received within a preset threshold time, the electronic apparatus 100 may perform step S330 to obtain a response message included in the third non-audible frequency signal and determine one of the electronic apparatus 100 and the first peripheral device 10 as the SoftAP device based on the performance information of the first peripheral device 11 and the performance information of the electronic apparatus 100 included in the obtained response message.

The electronic apparatus 100 may receive the third non-audible frequency signal including a response message output from the first peripheral device 11 among at least one peripheral device 10.

The electronic apparatus 100 may convert the received third non-audible frequency signal to a digital signal. The electronic apparatus 100 may obtain performance information of the first peripheral device 11 included in the response message of the first peripheral device 11 from the converted digital signal.

The electronic apparatus 100 may compare the performance information of the first peripheral device 11 and the performance information of the electronic apparatus 100.

The performance information of the first peripheral device 11 may include at least one of power information indicating a power budget of the first peripheral device 11, data processing information including at least one of a CPU processing speed, a CPU throughput, and a RAM version, the number of peripheral devices 10 capable of transmitting and receiving a message, external Internet accessibility information, and artificial intelligence (AI) supportability information.

The performance information of the electronic apparatus 100 may include at least one of power information indicating a power budget of the first peripheral device 11, data processing information including at least one of a CPU processing speed, a CPU throughput, and a RAM version, the number of peripheral devices 10 capable of transmitting and receiving a message, external Internet accessibility information, or artificial intelligence (AI) supportability information.

The electronic apparatus 100 may compare the performance information of the first peripheral device 11 and the performance information of the electronic apparatus 100 and determine a device including information of higher priority as the SoftAP device.

An operation to determine a device for performing an operation of the SoftAP device will be described in greater detail below.

When the electronic apparatus 100 is determined as the SoftAP device, the electronic apparatus 100 outputs a non-audible frequency signal for communication connection with the electronic apparatus 100 (hereinafter the second non-audible frequency signal) including a notification message notifying that the electronic apparatus 100 is determined as the SoftAP in operations S335 and S340.

The notification message may include ID and password information for connecting to the electronic apparatus 100 determined as the SoftAP device. However, the embodiment is not limited thereto, and the notification message may further include media access control (MAC) address information for communication connection with the electronic apparatus 100, product information of the electronic apparatus 100, or the like.

The second non-audible frequency signal including the above information may be a signal to provide the ID and password information for accessing the electronic apparatus 100 determined as the SoftAP device using at least one of the amplitude modulation, frequency modulation, and phase modulation of the non-audible frequency signal.

Upon receiving the second non-audible frequency signal output from the electronic apparatus 100, the first peripheral device 11, located in a range where transmitting and receiving non-audible frequency signal with the electronic apparatus 100 is available, converts the received second non-audible frequency signal into a digital signal. The first peripheral device 11 obtains ID and password information for accessing the electronic apparatus 100 from the converted digital signal, and performs a communication connection with the electronic apparatus 100 based on the obtained ID and password information.

The first peripheral device 11 periodically monitors whether a suspended communication connection with the AP device 20 with which communication connection with the electronic apparatus 100, which is the SoftAP device, is resumed. When the communication connection with the AP device 20 is resumed through monitoring, the first peripheral device 10 outputs a notification message for disconnection of communication with the electronic apparatus 100 as a non-audible frequency signal.

If a non-audible frequency signal including a notification message for disconnecting the communication connection output from the first peripheral device 11 is received, the electronic apparatus 100 may suspend communication connection with the first peripheral device 11 and resume communication with the AP device 20 in operations S345 and S350.

In step S335 described above, if the first peripheral device 11 is determined as the SoftAP device, the electronic apparatus 100 outputs a non-audible frequency signal including a notification message notifying that the first peripheral device 11 is determined as the SoftAP device in operation S355.

When a non-audible frequency signal including a notification for notifying performing an operation of the SoftAP device is received, the first peripheral device 11 outputs a non-audible frequency signal (hereinafter fourth non-audible frequency signal) for communication connection with the first peripheral device 11.

The electronic apparatus 100 performs communication connection with the first peripheral device 11 based on the information included in the fourth non-audible frequency signal output from the first peripheral device 11.

Figure 4:
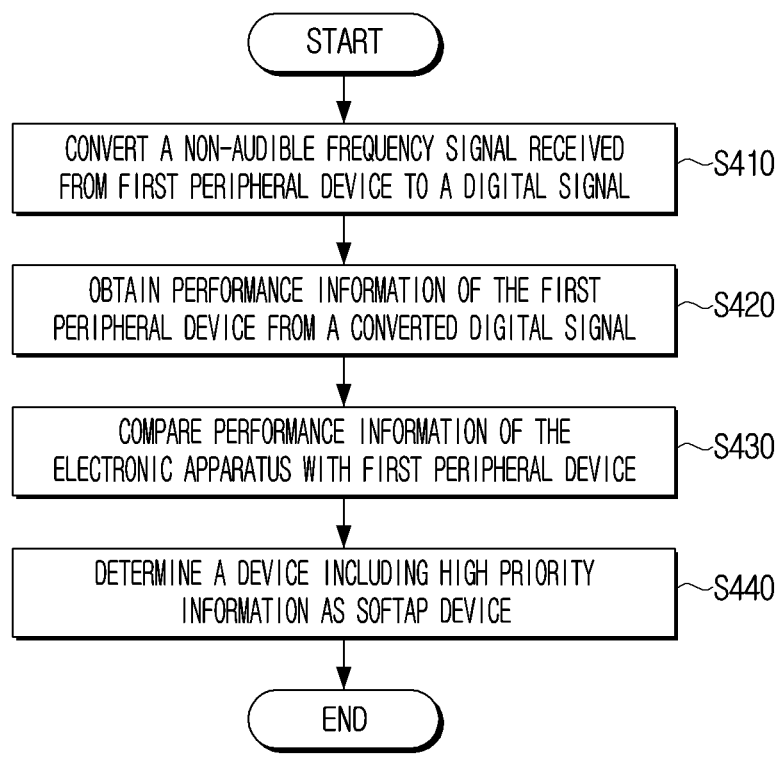
FIG. 4 is a flowchart illustrating an example method for determining a device to operate as a SoftAP device by an electronic apparatus according to an embodiment.

FIG. 4 is a flowchart illustrating an example method for determining a device to operate as a SoftAP device by an electronic apparatus according to an embodiment.

As illustrated in FIG. 4, the electronic apparatus 100 converts a third frequency signal into a digital signal if a non-audible frequency signal (hereinafter, referred to as a third non-audible frequency signal) including a response message is received from the first peripheral device 11 and then another non-audible frequency signal is not received within a preset threshold time in operation S410.

The electronic apparatus 100 obtains the performance information of the first peripheral device 11 included in the response message from the converted digital signal in operation S420. The electronic apparatus 100 compares the performance information of the obtained first peripheral device with the performance information of the electronic apparatus 100 to determine a device including the higher priority information as the SoftAP device in operations S430 and S440.

According to an embodiment, the electronic apparatus 100 may compare various information included in the performance information of the first peripheral device 11 and various information included in the performance information of the electronic apparatus 100 and determine a device including information on a preset priority as the SoftAP device.

For example, the information included in the performance information may have a set priority in the order of power information, data processing information, information on the number of peripheral device 10, external Internet accessibility information, and the AI supportability information.

The performance information of the first peripheral device 11 may include remaining information except the external Internet accessibility information, and the performance information of the electronic apparatus 100 may include all information.

The electronic apparatus 100 may determine the electronic apparatus 100 including high priority information between the first peripheral device 11 and the electronic apparatus 100 as the SoftAP device.

According to still another embodiment, the electronic apparatus 100 may determine a device including information on a corresponding priority as the SoftAP device, if the electronic apparatus 100 satisfies a predetermined condition based on the information included in the performance information of each of the first peripheral device 11 and the electronic apparatus 100.

For example, the power information and the data processing information included in the performance information are used as information for determining whether a predetermined condition is satisfied, and the information on the number of the peripheral device 10, the external Internet accessibility information, and the AI supportability information, which are the remaining information, can be prioritized in the listed order.

The electronic apparatus 100 may determine whether remaining battery amount to be supplied to each of the first peripheral device 11 and the electronic apparatus 100 is, for example, 30% or more, with reference to the power information included in performance information of each of the first peripheral device 11 and the electronic apparatus 100 (hereinafter first condition).

In addition, the electronic apparatus 100 may determine whether a CPU processing speed corresponding to each of the first peripheral device 11 and the electronic apparatus 100 is greater than or equal to a predetermined threshold speed by referring to data processing information included in the performance information of each of the first peripheral device 11 and the electronic apparatus 100 (hereinafter a second condition).

As a result of determination, if it is determined that the electronic apparatus 100, between the first peripheral device 11 and the electronic apparatus 100, satisfies both the first condition and the second condition, the processor 140 may determine the electronic apparatus 10 as the SoftAP device.

If the electronic apparatus 100 is determined as the SoftAP device through the embodiment, the electronic apparatus 100 outputs the second non-audible frequency signal including a notification message notifying that the electronic apparatus 100 is determined to be the SoftAP device.

As described above, the notification message may include the ID and the password information for accessing the electronic apparatus 100 determined as the SoftAP device.

Accordingly, when the first peripheral device 11 receives the second non-audible frequency signal output from the electronic apparatus 100, the first peripheral device 11 converts the received second non-audible frequency signal into a digital signal, and obtains ID and password information for accessing the electronic apparatus 100 from the converted digital signal. Thereafter, the first peripheral device 11 may perform a communication connection with the electronic apparatus 100 based on the obtained ID and password information.

When the first peripheral device 11 is determined as the SoftAP device, the electronic apparatus 100 may perform communication connection with the first peripheral device 10 determined as the SoftAP device through the method as shown below.

Figure 5:
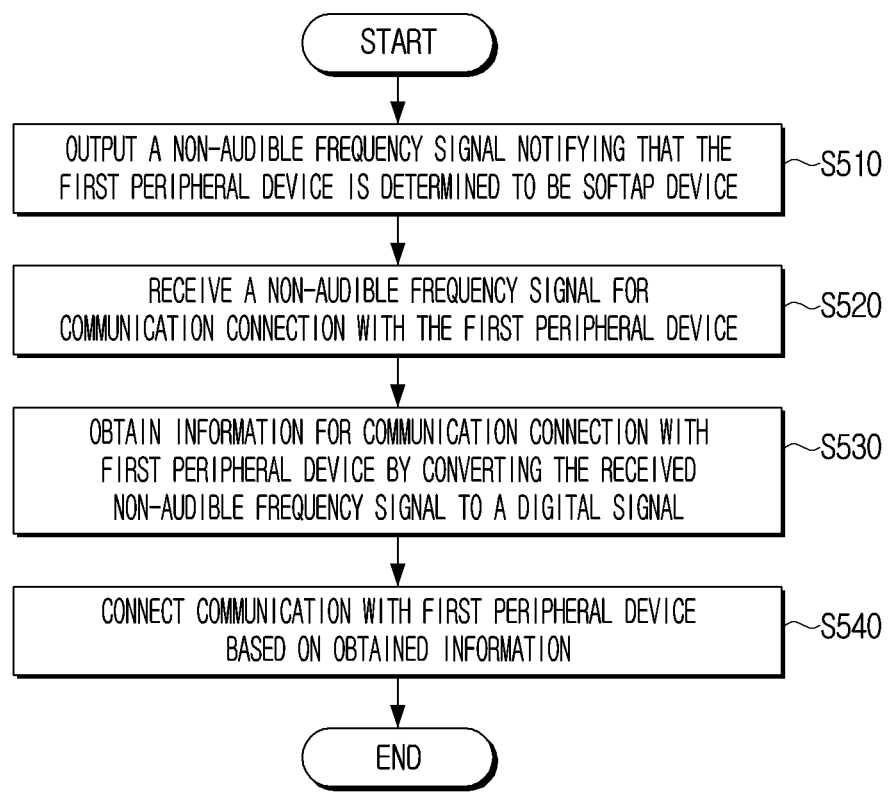
FIG. 5 is a flowchart illustrating an example method of performing communication connection with a peripheral device to operate as a SoftAP device by an electronic apparatus according to an embodiment.

FIG. 5 is a flowchart illustrating an example method of performing communication connection with a peripheral device to operate as a SoftAP device by an electronic apparatus according to an embodiment.

As described above, the first peripheral device 11 may be determined as the SoftAP device.

As illustrated in FIG. 5, the electronic apparatus 100 outputs a non-audible frequency signal including a notification message notifying that the first peripheral device 11 is determined as the SoftAP device in operation S510.

Accordingly, the first peripheral device 11 of the at least one peripheral device 10 confirms that the first peripheral device 11 has been determined to be the SoftAP device based on the non-audible frequency signal output from the electronic apparatus 100, and activates the AP mode. The first peripheral device 11 then outputs a non-audible frequency signal (hereinafter referred to as the fourth non-audible frequency signal) for the communication connection with the first peripheral device 11 in which the AP mode is activated.

The electronic apparatus 100 converts the received fourth non-audible frequency signal when the fourth non-audible frequency signal outputted from the first peripheral device 11 is received, and obtains information including an ID and a password for communication connection with the first peripheral device 11 from the converted digital signal in operations S520 and S530. The electronic apparatus 100 may further obtain MAC address information for communication connection with the first peripheral device 11 from the fourth non-audible frequency signal converted into a digital signal, product information of the first peripheral device 11, or the like.

When the information is obtained, the electronic apparatus 100 performs communication connection with the first peripheral device 11 in which the AP mode is activated based on the ID and the password among the obtained information in operation S540.

Hereinafter, the operation of forming a new network and the first and second peripheral devices 11 and 12 in the vicinity of the electronic apparatus 100 will be described in detail when an event of suspending a communication connection with the AP device 20 is generated in the electronic apparatus 100 according to an embodiment.

Figure 6:
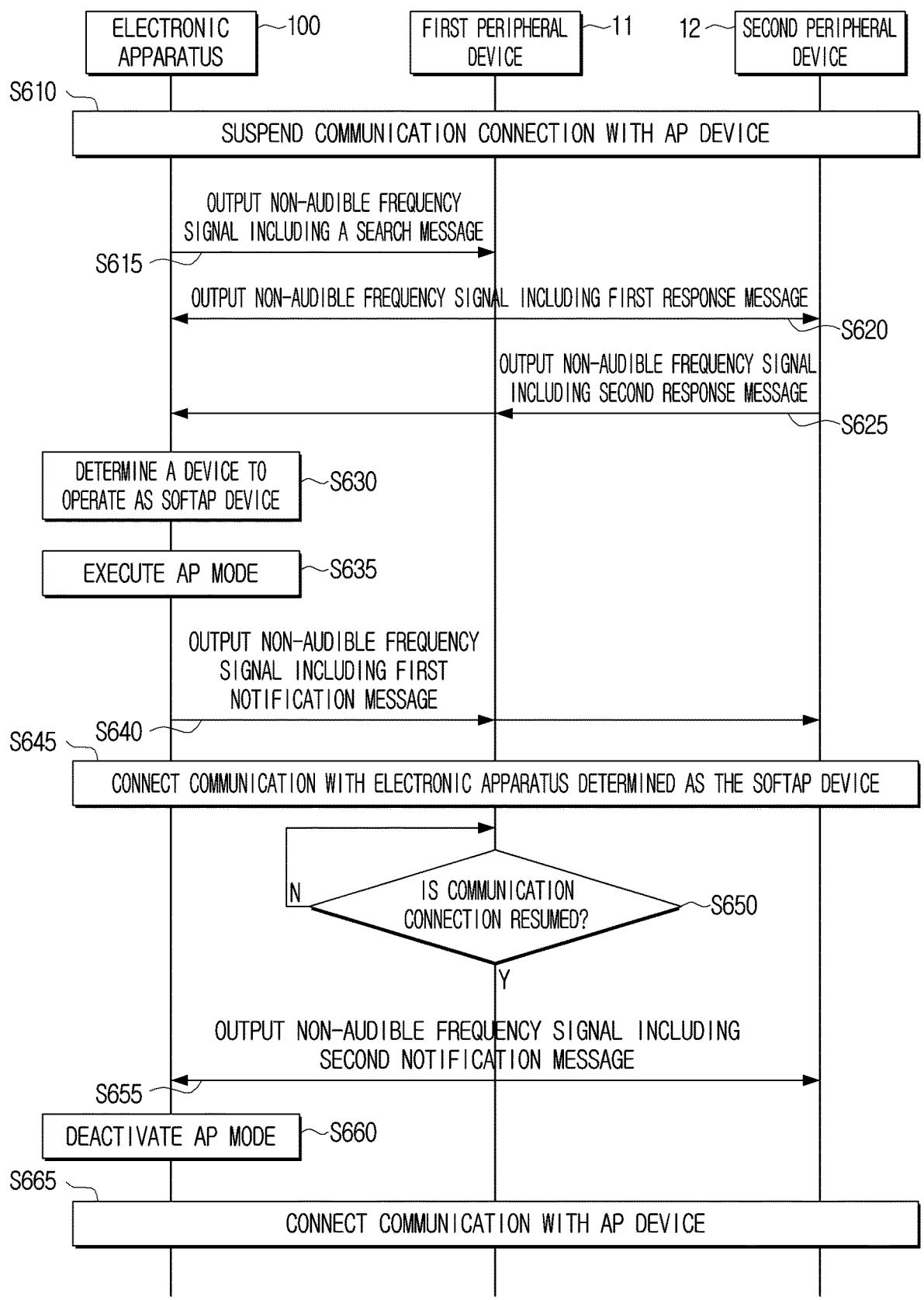
FIG. 6 is a signal flow diagram illustrating an example operation of forming a network with a peripheral device by an electronic apparatus according to an embodiment.

FIG. 6 is a signal flow diagram illustrating an example of forming a network with a peripheral device by an electronic apparatus according to an embodiment.

As illustrated in FIG. 6, the electronic apparatus 100 and the first and second peripheral devices 11 and 12 in communication with the AP device 20, which are the same as the electronic apparatus 100, periodically monitor the communication connection state with the AP 20 and determine whether an event in which the communication connection with the AP device 20 has been suspended occurs.

As a result of the determination, when an event in which communication connection with the AP device 20 has been suspended occurs (S610), the electronic apparatus 100 and the first and second peripheral devices 11 and 12 output a non-audible frequency signal (hereinafter, referred to as the first non-audible frequency signal) including a search message after the random delay.

The random delay that occurs in the electronic apparatus 100 and the first and second peripheral devices 11 and 12 may be set to different times.

One of the electronic apparatus 100 and the first and second peripheral devices 11, 12 which is set as having the fastest random delay, may output the first non-audible frequency signal including the initial search message, and the other devices receiving the first non-audible frequency signal do not output the first non-audible frequency signal.

In the embodiment, it will be described that the electronic apparatus 100 outputs the first non-audible frequency signal including the initial search message.

As described above, when communication connection with the AP device 20 is suspended, the electronic apparatus 100 outputs the first non-audible frequency signal including the search message in operations S610 and S615.

The first peripheral device 11 out of the first and second peripheral devices 11 and 12 may be located at a distance that can receive the first non-audible frequency signal output from the electronic apparatus 100. In this example, the first peripheral device 11 outputs a non-audible frequency signal (hereinafter referred to as a second non-audible frequency signal) including a first response message based on the received the first non-audible frequency signal when the first non-audible frequency signal is received in operation S620.

The first response message included in the second non-audible frequency signal may include at least one of the identification information and address information of the first peripheral device 11 and the performance information of the first peripheral device 11.

The first peripheral device 11 may be located within a range capable of transmitting and receiving a non-audible frequency signal with the electronic apparatus 100 and the second peripheral device 12.

The electronic apparatus 100 and the second peripheral device 12 receive the second non-audible frequency signal including the first response message.

The electronic apparatus 100 determines whether another non-audible frequency signal is received within a predetermined threshold time after the corresponding signal is received when the second non-audible frequency signal including the first response message output from the first peripheral device 11 is received.

When the second non-audible frequency signal including a first response message is received, the second peripheral device 12 outputs a non-audible frequency signal (hereinafter, referred to as a third non-audible frequency signal) including a second response message based on a first response message included in the received second non-audible frequency signal in operation S625.

The second response message may include at least one of the identification information and the address information of the second peripheral device 12 and the performance information of the second peripheral device 12 along with the information included in the first response message.

Accordingly, when a third non-audible frequency signal output from the second peripheral device 12 is received, the first peripheral device 11, which is located within a range capable of transmitting and receiving non-audible frequency signal with the second peripheral device 12, outputs a received third non-audible frequency signal.

Accordingly, the electronic apparatus 100 and the second peripheral device 12 located within a range capable of transmitting and receiving the non-audible frequency signal with the first peripheral device 11 may receive a third non-audible frequency signal output from the first peripheral device 11.

The second peripheral device 12 determines that the received third non-audible frequency signal is a signal output from the second peripheral device 12 based on a second response message included in the third non-audible frequency signal output from the first peripheral device 11, and does not output a non-audible frequency signal including an additional response message.

When the electronic apparatus 100 receives a third non-audible frequency signal including a second response message, the electronic apparatus 100 determines that the second non-audible frequency signal including the previously received first response message is different from the second non-audible frequency signal based on the information included in the received second response message.

Thus, the electronic apparatus 100 determines whether another non-audible frequency signal is received within a predetermined threshold time, after the third non-audible frequency signal including the second response message is received.

As a result of the determination, if another non-audible frequency signal is not received within a predetermined threshold time after the third non-audible frequency signal is received, the electronic apparatus 100 determines the device to operate as the SoftAP device based on the second response message included in the received third non-audible frequency signal in operation S630.

The electronic apparatus 100 converts the received third non-audible frequency signal to a digital signal and obtains the second response message from the converted digital signal.

The electronic apparatus 100 compares the performance information of each of the first and second peripheral devices 11 and 12 included in the obtained second response message and the performance information of the electronic apparatus 100.

The operation of determining a device to be operated as the SoftAP device by comparing the performance information of the first and second peripheral devices 11 and 12 with the performance information of the electronic apparatus 100 has been described in detail above, and thus a detailed description may not be repeated here.

When the electronic apparatus 100 is determined as the device to operate as the SoftAP device by comparing the performance information of each of the first and second peripheral devices 11 and 12 and the performance information of the electronic apparatus 100, the electronic apparatus 100 executes the AP mode so that the first and second peripheral devices 11 and 12 are communicatively connected to the electronic apparatus 100 in operation S635.

When the AP mode is executed, the electronic apparatus 100 outputs a non-audible frequency signal (hereinafter referred to as a fourth non-audible frequency signal) that includes a first notification message indicating that the electronic apparatus 100 has been determined to be the SoftAP device in operation S640.

The first notification message may include the information of a device determined as the SoftAP device and information including the ID and password for communication connection with the electronic apparatus 100 determined as the SoftAP device.

When the fourth non-audible frequency signal output from the electronic apparatus 100 is received, the first peripheral device 11 that is located in arrange capable of transmitting and receiving the non-audible frequency signal with the electronic apparatus 100 outputs the received fourth non-audible frequency signal. Accordingly, the second peripheral device 12 that is located within a range capable of transmitting and receiving the non-audible frequency signal with the first peripheral device 11 may receive the fourth non-audible frequency signal output from the first peripheral device 11.

When the fourth non-audible frequency signal output from the electronic apparatus 100 is received in both the first and second peripheral devices 11 and 12, the first and second peripheral devices 11 and 12 perform a communication connection with the electronic apparatus 100 determined as the SoftAP device based on the ID and the password included in the first notification message included in the received fourth non-audible frequency signal in operation S645.

The first peripheral device 11 between the first and second peripheral devices 11 and 12 communicatively connected to the electronic apparatus 100 determined as the SoftAP device monitors whether the communication connection with the AP device 20 is resumed in operation S650.

When the communication connection with the AP device 20 is resumed through monitoring, the first peripheral device 11 outputs a second notification message for disconnection of communication with the electronic apparatus 100 as a non-audible frequency signal (hereinafter referred to as a fifth non-audible frequency signal) in operation S655.

Thus, the electronic apparatus 100 and the second peripheral device 12 located in the communicable range with the first peripheral device 11 may receive the fifth non-audible frequency signal output from the first peripheral device 11, and the electronic apparatus 100 deactivates the activated AP mode based on the received fifth non-audible frequency signal in operation S660.

Thereafter, the first peripheral device 11 outputting the fifth non-audible frequency signal and the electronic apparatus 100 and the second peripheral device 12 receiving the fifth non-audible frequency signal resume communication with the AP device 20 in operation S665.

The embodiment is not limited thereto, and in step S650 described above, each of the first and second peripheral devices 11 and 12, which are communicatively coupled with the electronic apparatus 100 determined as the SoftAP device may monitor whether a communication connection with the AP device 20 is resumed.

If the communication connection with the AP device 20 is resumed through monitoring, the first and second peripheral devices 11 and 12 may output the fifth non-audible frequency signal. Thus, when the fifth non-audible frequency signal output from at least one of the first and second peripheral devices 11 and 12 is received, the electronic apparatus 100 may deactivate the activated AP mode based on the received fifth non-audible frequency signal.

The electronic apparatus 100 and the first and second peripheral devices 11 and 12 may resume communication with the AP device 20.

Figure 7:
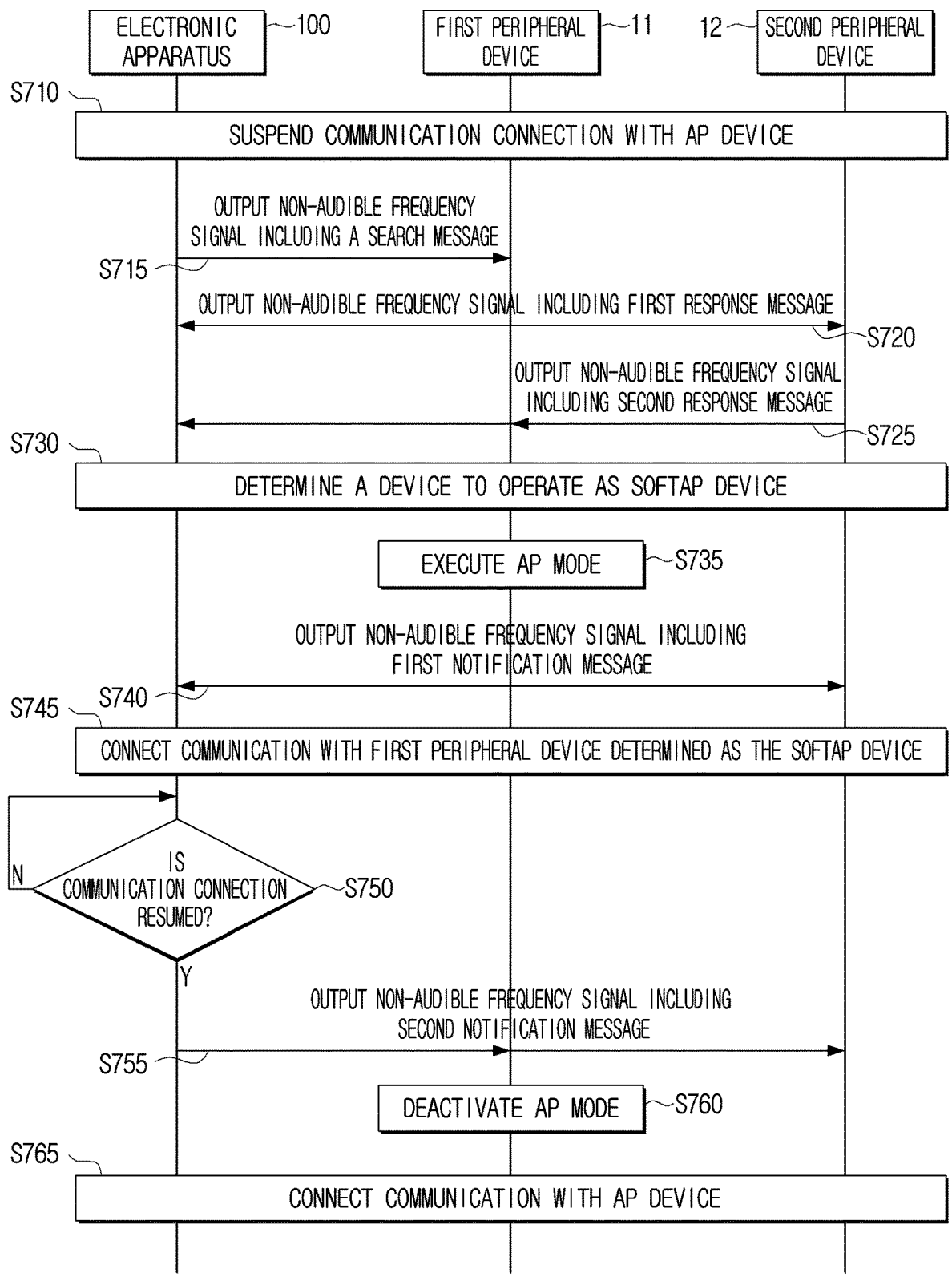
FIG. 7 is a signal flow diagram illustrating an example operation of forming a network with a peripheral device by an electronic apparatus according to an embodiment.

FIG. 7 is a signal flow diagram illustrating an example of forming a network with a peripheral device by an electronic apparatus according to an embodiment.

As illustrated in FIG. 7, the electronic apparatus 100 and the first and second peripheral devices 11 and 12 in communication with the AP device 20, which is the same as the electronic apparatus 100, periodically monitors the communication connection state with the AP device 20 to determine whether an event in which the communication connection with the AP device 20 has been suspended occurs.

As a result of the determination, when an even in which communication connection with the AP device 20 is suspended occurs, the electronic apparatus 100 and the first and second peripheral devices 11 and 12 output a non-audible frequency signal (hereinafter, referred to as the first non-audible frequency signal) including a search message after the random delay.

The random delay occurring in the electronic apparatus 100 and the first and second peripheral devices 11 and 12 may be set to different times.

Thus, one of the electronic apparatus 100 and the first and second peripheral devices 11, 12 which is set to have the fastest random delay can output the first non-audible frequency signal including the initial search message, and the other device receiving the first non-audible frequency signal does not output the first non-audible frequency signal.

In the disclosure, it will be described that the electronic apparatus 100 outputs the first non-audible frequency signal including the initial search message.

As described above, when communication connection with the AP device 20 is suspended, the electronic apparatus 100 outputs the first non-audible frequency signal including the search message in operations S710 and S715.

The first peripheral device 11 between the first and second peripheral devices 11 and 12 may be located at a distance that can receive the first non-audible frequency signal output from the electronic apparatus 100. In this case, the first peripheral device 11 outputs a non-audible frequency signal (hereinafter referred to as a second non-audible frequency signal) including a first response message based on the received first non-audible frequency signal when the first non-audible frequency signal is received in operation S720.

The first response message included in the second non-audible frequency signal may include at least one of identification information and address information of the first peripheral device 11 and the performance information of the first peripheral device 11.

The first peripheral device 11 may be located in a range capable of receiving and transmitting a non-audible frequency signal with the electronic apparatus 100 and the second peripheral device 12.

In this example, the electronic apparatus 100 and the second peripheral device 12 receive the second non-audible frequency signal including the first response message.

The electronic apparatus 100 determines whether another non-audible frequency signal is received within a predetermined threshold time after the corresponding signal is received when the second non-audible frequency signal including the first response message output from the first peripheral device 11 is received.

When the second non-audible frequency signal including the first response message is received, the second peripheral device 12 outputs a non-audible frequency signal (hereinafter, referred to as a third non-audible frequency signal) including a second response message based on a first response message included in the received second non-audible frequency signal in operation S725.

Here, the second response message may include at least one of the identification information and the address information of the second peripheral device 12 and the performance information of the second peripheral device 12, along with the information included in the first response message.

Accordingly, when a third non-audible frequency signal output from the second peripheral device 12 is received, the first peripheral device 11 located within the range capable of transmitting and receiving the non-audible frequency signal to the second peripheral device 12 outputs the received third non-audible frequency signal.

Accordingly, the electronic apparatus 100 and the second peripheral device 12 located within a range capable of transmitting and receiving the non-audible frequency signal with the first peripheral device 11 may receive a third non-audible frequency signal output from the first peripheral device 11.

When the third non-audible frequency signal is received, the electronic apparatus 100 and the first and second peripheral devices 11 and 12 determine whether a still another frequency signal is received within a preset threshold time after the third non-audible frequency is received.

If another non-audible frequency signal is not received within a predetermined threshold time after the third non-audible frequency is received, the electronic apparatus 100, the first and second peripheral devices 11 and 12, respectively, determine the device to operate as the SoftAP device based on the second response message included in the third non-audible frequency signal in operation S730.

For example, the electronic apparatus 100 and the first and second peripheral devices 11 and 12, respectively, convert the received third non-audible frequency signal into a digital signal, and then receive the second response message from the converted digital signal.

The electronic apparatus 100 and the first and second peripheral devices 11 and 12, respectively, compare performance information corresponding to each of the electronic apparatus 100 and the first and second peripheral devices 11 and 12.

The device which will operate as the SoftAP device among the electronic apparatus 100 and the first and second peripheral devices 11 and 12 activate the AP mode to be communicatively connected to the remaining devices in operation S735.

The device in which the AP mode is executed outputs a non-audible frequency signal (hereinafter, the fourth non-audible frequency signal) including the first notification message notifying that the device is determined to be the SoftAP device in operation S740.

For example, the electronic apparatus 100 and the first peripheral device 11 between the first and second peripheral devices 11 and 12 may be a device which is determined to be the SoftAP device.

In this example, the first peripheral device 11 outputs a non-audible frequency signal (hereinafter referred to as a fourth inaudible frequency signal) including a first notification message indicating that the first peripheral device 11 has been determined to be the SoftAP device.

Here, the first notification message may include information on a device determined as the SoftAP device, and information including an ID and a password for the communication connection with the first peripheral device 11 determined as the SoftAP device.

If the fourth non-audible frequency signal output from the first peripheral device 11 is received, the electronic apparatus 100 and the second peripheral device 12 that are located in a range capable of transmitting and receiving the non-audible frequency signal perform a communication connection with the first peripheral device 11, which is determined as the SoftAP device based on the ID and the password included in the first notification message included in the received fourth non-audible frequency signal in operation S745.

Thereafter, between the electronic apparatus 100 communicatively connected to the first peripheral device 11 determined as the SoftAP device and the second peripheral device 12, the electronic apparatus 100 monitors whether communication with the AP device 20 is resumed in operation S750.

If the communication connection with the AP device 20 is resumed through monitoring, the electronic apparatus 100 outputs a second notification message for disconnection of communication with the first peripheral device 11 as a non-audible frequency signal (hereinafter referred to as a fifth non-audible frequency signal) in operation S755.

If the fifth non-audible frequency signal output from the electronic apparatus 100 is received, the first peripheral device 11 which is located in a range communicable with the electronic apparatus 100 outputs the received fifth non-audible frequency signal to the second peripheral device 12.

The first peripheral device 11 then deactivates the activated AP mode based on the received fifth non-audible frequency signal in operation S760.

The electronic apparatus 100 outputting the fifth non-audible frequency signal, the first peripheral device 11 receiving the fifth non-audible frequency signal output from the electronic apparatus 100, and the second peripheral device 12 receiving the fifth non-audible frequency signal through the first peripheral device 11 resume communication with the AP device 20 in operation S765.

The embodiment is not limited thereto, and each of the electronic apparatus 100 and the second peripheral device 12 communicatively connected to the first peripheral device 11 which is determined as the SoftAP device in step S750 described above may monitor whether communication connection with the AP device 20 is resumed.

If the communication connection with the AP device 20 is resumed through monitoring, the electronic apparatus 100 and the second peripheral device 12 may output a fifth non-audible frequency signal. Accordingly, when the fifth non-audible frequency signal output from at least one of the electronic apparatus 100 and the second peripheral device 12 is received, the first peripheral device 11 may deactivate the activated AP mode based on the received fifth non-audible frequency signal.

The electronic apparatus 100 and the first and second peripheral devices 11 and 12 may resume communication with the AP device 20.

Various embodiments may be implemented as software that includes instructions stored in machine-readable storage media readable by a machine (e.g., a computer). A device may call instructions from a storage medium and operate in accordance with the called instructions, including an electronic apparatus (e.g., the electronic apparatus 100). When the instruction is executed by a processor, the processor may perform the function corresponding to the instruction, either directly or under the control of the processor, using other components. The instructions may include a code generated by a compiler or a code executable by an interpreter. The machine-readable storage medium may be provided in the form of a non-transitory storage medium. The "non-transitory" storage medium may not include a signal and is tangible, but does not distinguish whether data is permanently or temporarily stored in a storage medium.

According to embodiments of the disclosure, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., PlayStore™, AppStore™). In the case of on-line distribution, at least a portion of the computer program product may be stored temporarily or at least temporarily in a storage medium, such as a manufacturer's server, a server in an application store, a memory in a relay server, and the like.

Each of the components (for example, a module or a program) according to the embodiments may include one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

While the disclosure has been illustrated and described with reference to various example embodiments, it will be understood that the various example embodiments are intended to be illustrative, not limiting. One of ordinary skill in the art will understand that various changes in form and details may be made without departing from the spirit and scope of the disclosure, including the appended claims and their equivalents.

What is claimed is:

1. A method for controlling an electronic apparatus, the method comprising:
   monitoring a state of communication connection with an access point (AP) device;
   based on determining an event to suspend communication connection with the AP device, outputting a search message requesting information on at least one peripheral device within a specified range of the electronic apparatus as a first non-audible frequency signal;
   receiving a response message from the at least one peripheral device in response to the search message;
   determining a device, among the electronic apparatus and the at least one peripheral device, to perform an operation of the AP device based on performance information of the at least one peripheral device included in the received response message and performance information of the electronic apparatus; and
   outputting information for communication connection with the electronic apparatus as a second non-audible frequency signal based on the electronic apparatus being determined as a device to perform an operation of the AP device,
      wherein the determining comprises: converting a third non-audible frequency signal to a digital signal based on receiving the third non-audible frequency signal including the response message through a microphone from a first peripheral device of the at least one peripheral device; and obtaining, from the converted digital signal, performance information comprising at least one of external Internet communication accessibility information, power information, data processing information of the first peripheral device, or information on a number of peripheral devices capable of transmitting and receiving a message included in a response message of the first peripheral device.

2. The method of claim 1, wherein the search message comprises at least one of identification information, address information or performance information of the electronic apparatus, and
   wherein the response message comprises at least one of identification information, address information or performance information of the peripheral device.

3. The method of claim 1, wherein the first non-audible frequency signal is configured to provide at least one of identification information, address information or the performance information of the electronic apparatus using at least one of amplitude modulation, frequency modulation, or phase modulation of a non-audible frequency signal.

4. The method of claim 1, wherein the outputting comprises:
   determining an intensity of the first non-audible frequency signal by adjusting a volume intensity of a speaker of the electronic apparatus.

5. The method of claim 1, wherein the determining further comprises:
   determining a device, among the first peripheral device and the electronic apparatus, comprising information with a high priority as a device to perform an operation of the AP device by comparing performance information of the first peripheral device and the performance information of the electronic apparatus.

6. The method of claim 1, wherein a first peripheral device of the at least one peripheral device, based on receiving the first non-audible frequency signal comprising the search message, outputs information included in the search message and a response message comprising at least one of identification (ID) information, address information, or performance information of the first peripheral device as a non-audible frequency signal after a random delay.

7. The method of claim 1, wherein the second non-audible frequency signal comprises ID and password information to access the electronic apparatus using at least one of amplitude modulation, frequency modulation, or phase modulation of a non-audible frequency signal.

8. The method of claim 1, further comprising:
   outputting a notification message notifying that an operation of the AP device is performed by a first peripheral device as a non-audible frequency signal based on identifying that the first peripheral device of the at least one peripheral device performs an operation of the AP device;
   converting a fourth non-audible frequency signal to a digital signal based on receiving the fourth non-audible frequency signal for communication connection with the first peripheral device from the first peripheral device;
   obtaining ID and password information for communication connection with the first peripheral device from the converted digital signal; and
   performing communication connection with the first peripheral device based on the obtained ID and password.

9. The method of claim 1, further comprising:
   outputting information included in the search message and a response message comprising at least one of identification information, address information or performance information of the electronic apparatus as a sixth non-audible frequency signal based on receiving a fifth non-audible frequency signal for the search message from a first peripheral device of the at least one peripheral device, after a random delay.

10. The method of claim 1, further comprising:
    outputting a notification message to disconnect communication connection as a non-audible frequency signal based on a suspended communication connection with the AP device with which the communication connection is established being resumed.

11. An electronic apparatus comprising:
    an outputter comprising output circuitry;
    an inputter comprising input circuitry and a microphone;
    a communicator comprising communication circuitry configured to perform communication with an access point (AP) device; and
    a processor configured to:
    monitor a state of communication connection with the AP device,
    based on determining an event suspending communication with the AP device, control the outputter to output a search message requesting information on at least one peripheral device within a specified range of the electronic apparatus as a first non-audible frequency signal,
receive a response message from the at least one peripheral device in response to the search message,
determine a device to perform an operation of the AP device among the electronic apparatus and the at least one peripheral device based on performance information of the at least one peripheral device included in the received response message and performance information of the electronic apparatus, and
control the outputter to output information for communication connection with the electronic apparatus as a second non-audible frequency signal based on the electronic apparatus being determined as a device to perform an operation of the AP device,
wherein the processor is further configured to:
convert a third non-audible frequency signal to a digital signal based on receiving the third non-audible frequency signal including the response message through the microphone from a first peripheral device of the at least one peripheral device, and
obtain, from the converted digital signal, performance information comprising at least one of external Internet communication accessibility information, power information, data processing information of the first peripheral device, or information on a number of peripheral devices capable of transmitting and receiving a message included in a response message of the first peripheral device.

12. The apparatus of claim 11, wherein the search message comprises at least one of identification information, address information or performance information of the electronic apparatus, and
wherein the response message comprises at least one of identification information, address information or performance information of the peripheral device.

13. The apparatus of claim 11, wherein the first non-audible frequency signal is configured to provide at least one of identification information, address information or the performance information of the electronic apparatus using at least one of amplitude modulation, frequency modulation, or phase modulation of a non-audible frequency signal.

14. The apparatus of claim 11, wherein the outputter comprises:
a speaker,
wherein the processor is configured to determine an intensity of the first non-audible frequency signal by adjusting a volume intensity of the speaker.

15. The apparatus of claim 11,
wherein the processor is further configured to:
determine a device, among the first peripheral device and the electronic apparatus, comprising information with a high priority as a device to perform an operation of the AP device by comparing performance information of the first peripheral device and the performance information of the electronic apparatus.

16. The apparatus of claim 11, wherein a first peripheral device of the at least one peripheral device, based on receiving the first non-audible frequency signal comprising the search message, is configured to output information included in the search message and a response message comprising at least one of identification (ID) information, address information, or performance information of the first peripheral device as a non-audible frequency signal after a random delay.

17. The apparatus of claim 11, wherein the second non-audible frequency signal comprises identification and password information to access the electronic apparatus using at least one of amplitude modulation, frequency modulation, or phase modulation of a non-audible frequency signal.

18. The apparatus of claim 11, wherein the processor is further configured to:
control the outputter to output a notification message notifying that an operation of the AP device is performed by a first peripheral device as a non-audible frequency signal based on identifying that the first peripheral device of the at least one peripheral device performs an operation of the AP device, convert a fourth non-audible frequency signal to a digital signal based on receiving the fourth non-audible frequency signal for communication connection with the first peripheral device from the first peripheral device, obtaining ID and password information for communication connection with the first peripheral device from the converted digital signal, and perform communication connection with the first peripheral device based on the obtained ID and password.

19. The apparatus of claim 11, wherein the processor is further configured to:
output information included in the search message and a response message comprising at least one of identification information, address information or performance information of the electronic apparatus as a sixth non-audible frequency signal based on receiving a fifth non-audible frequency signal for the search message from a first peripheral device of the at least one peripheral device, after a random delay.

20. The electronic apparatus of claim 11, wherein the processor is further configured to,
control the outputter to output a notification message to disconnect communication connection as a non-audible frequency signal based on a suspended communication connection with the AP device with which the communication connection is established being resumed.

* * * * *